(12) United States Patent
Ohnishi

(10) Patent No.: US 10,507,675 B2
(45) Date of Patent: Dec. 17, 2019

(54) PRINTING METHOD, PRINTING DEVICE, AND PRINTING SYSTEM

(71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/041,841

(22) Filed: Jul. 23, 2018

(65) Prior Publication Data

US 2019/0030917 A1 Jan. 31, 2019

(30) Foreign Application Priority Data

Jul. 26, 2017 (JP) .................................. 2017-144866

(51) Int. Cl.
*B41J 11/00* (2006.01)
*C09D 11/101* (2014.01)
(Continued)

(52) U.S. Cl.
CPC ............ *B41J 11/002* (2013.01); *B41J 2/2117* (2013.01); *B41M 7/0018* (2013.01);
(Continued)

(58) Field of Classification Search
CPC ...... B41J 11/002; B41J 2/0057; B41J 2/2117; C09D 11/40; C09D 11/322; C09D 11/101;
(Continued)

(56) References Cited

U.S. PATENT DOCUMENTS 9,186,916 B1 * 11/2015 Ishihara ............... B41M 7/0045
2005/0190248 A1 * 9/2005 Konno ..................... B41J 2/155
347/102
(Continued)

FOREIGN PATENT DOCUMENTS

EP 2675627 12/2013
EP 3124261 2/2017
(Continued)

OTHER PUBLICATIONS

"Search Report of Europe Counterpart Application", dated Jan. 18, 2019, p. 1-p. 12.

*Primary Examiner* — Stephen D Meier
*Assistant Examiner* — Alexander D Shenderov
(74) *Attorney, Agent, or Firm* — JCIPRNET

(57) ABSTRACT

A high-gloss, precise and vivid image is printed appropriately. The printing method performs a printing using a color ink on a medium, and includes: a color ink layer forming step of ejecting the color ink to a medium to form a layer of the color ink, that is, a colored ink layer on the medium; and a glossing step of performing a process for increasing a gloss of the colored ink layer. The color ink includes a colorant and a solvent and generates heat by radiation of an energy ray. In the color ink layer forming step, the energy ray is emitted to the color ink adhering to the medium to remove by evaporation at least a part of the solvent included in the color ink. In the glossing step, the gloss of the colored ink layer is increased after a part of the solvent is removed by evaporation.

12 Claims, 11 Drawing Sheets

(51) Int. Cl.
*C09D 11/322* (2014.01)
*B41J 2/21* (2006.01)
*B41M 7/00* (2006.01)
*C09D 11/40* (2014.01)

(52) U.S. Cl.
CPC ........ *B41M 7/0045* (2013.01); *B41M 7/0081* (2013.01); *C09D 11/101* (2013.01); *C09D 11/322* (2013.01); *C09D 11/40* (2013.01)

(58) Field of Classification Search
CPC . B41M 7/0081; B41M 7/0045; B41M 7/0018
USPC .......................................................... 347/102
See application file for complete search history.

(56) References Cited

U.S. PATENT DOCUMENTS

| | | | |
|---|---|---|---|
| 2008/0024557 A1* | 1/2008 | Moynihan | B41J 11/002 347/56 |
| 2008/0186352 A1* | 8/2008 | Sasayama | B41J 2/16552 347/30 |
| 2012/0154496 A1* | 6/2012 | Breton | B41J 2/0057 347/102 |
| 2013/0222499 A1* | 8/2013 | Cong | B41J 2/2107 347/102 |
| 2014/0354744 A1 | 12/2014 | Ohnishi | |
| 2015/0267073 A1* | 9/2015 | Zhou | B41M 5/502 428/205 |

FOREIGN PATENT DOCUMENTS

| | | |
|---|---|---|
| WO | 2006038457 | 4/2006 |
| WO | 2016117550 | 7/2016 |
| WO | 2017104845 | 6/2017 |
| WO | 2017135425 | 8/2017 |

\* cited by examiner

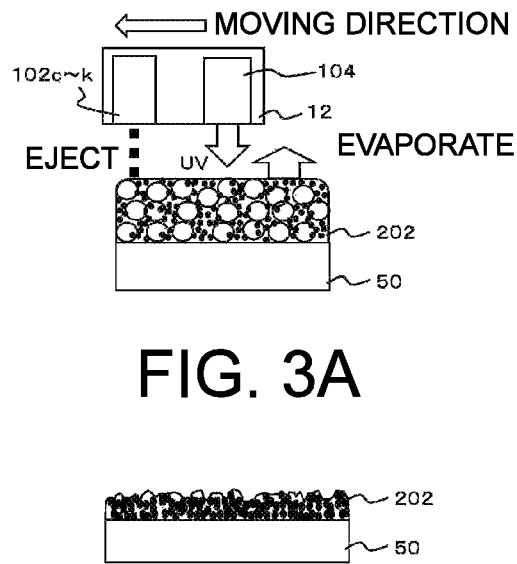
FIG. 3A
FIG.3B
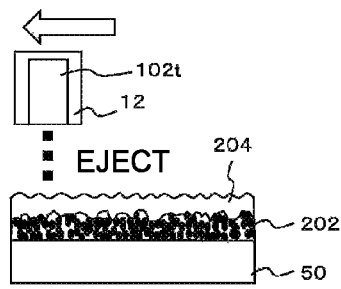
FIG.3C
FIG.3D
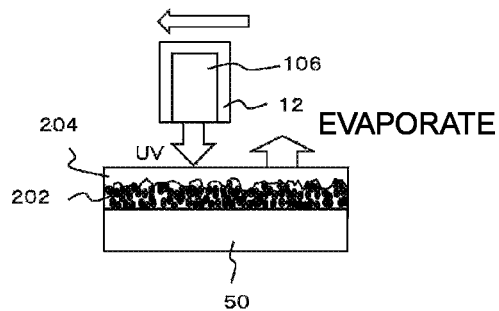
FIG.3E
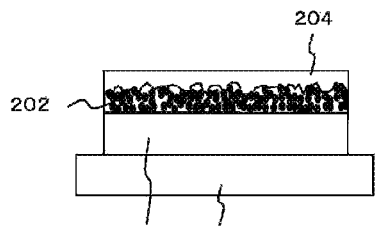
FIG.3F
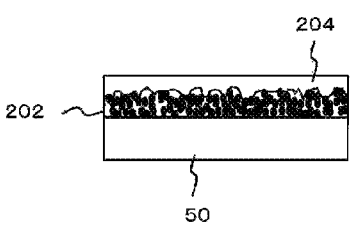
FIG.3G ved a patent application for such a
configuration (for example, see PCT JP2017-004025). The
configuration disclosed in Patent Literature 1, for example,
can appropriately perform printing on a variety of media
without forming an ink receiving layer. This configuration
eliminates or reduces nozzle clogging because ink is directly
heated, rather than indirectly heating by heating a medium.

PRINTING METHOD, PRINTING DEVICE, AND PRINTING SYSTEM

CROSS REFERENCE TO RELATED APPLICATIONS

This application claims the priority benefit of Japanese Patent Application No. 2017-144866, filed on Jul. 26, 2017. The entirety of the above-mentioned patent application is hereby incorporated by reference herein and made a part of this specification.

TECHNICAL FIELD

The present disclosure relates to a printing method, a printing device, and a printing system.

BACKGROUND ART

Conventionally, inkjet printers performing inkjet printing have been widely used. One of inks widely used in inkjet printers is evaporation-drying (evaporation-drying and fixing) ink that fixes on a medium through evaporation of a solvent therein. More specifically, examples of evaporation-drying inks widely used include water-based pigment inks, latex inks, and solvent inks. In use of evaporation-drying ink, it is important to appropriately prevent bleeding of ink. One of conventionally known methods for preventing bleeding of evaporation-drying ink is to form an ink receiving layer on a medium. Another known method for preventing bleeding is to heat the medium, for example, with a print heater to heat the ink immediately after droplets land onto a medium.

Unfortunately, in the method of forming an ink receiving layer on a medium, it is necessary to use a special medium having an ink receiving layer formed in advance, causing a problem in that usable media are extremely limited. In addition, for example, there may be another problem in that strike-through occurs due to the solvent left after printing. Moreover, for example, when paper is used as a base layer on which an ink receiving layer is to be formed, using a large amount of ink for color printing may lead to bleeding, curling, or other problems. When a fabric medium such as cloth is used, the medium need to be coated with a preprocessing agent, such as a glue functioning as an ink receiving layer for preventing bleeding or an additive for assisting in color development of ink. In this case, for example, it is necessary to request the preprocessing of professionals, leading to a problem of time loss and cost increase. When heating is performed with a print heater or the like, ink is indirectly heated by heating a medium. In this configuration, excess heat is likely to cause adverse effects. More specifically, for example, heating the nozzle surface of the inkjet head with a heater tends to cause nozzle clogging or other problems. Such a problem is conspicuous, for example, particularly when the temperature for heating is increased in order to increase the printing speed.

In this respect, the inventor of the subject application has conceived of rapidly evaporating a solvent in ink by directly heating by ultraviolet radiation for evaporation-drying inks. The inventor has filed a patent application for such a configuration (for example, see PCT JP2017-004025). The configuration disclosed in Patent Literature 1, for example, can appropriately perform printing on a variety of media without forming an ink receiving layer. This configuration eliminates or reduces nozzle clogging because ink is directly heated, rather than indirectly heating by heating a medium.

Patent Literature 1: PCT JP2017-004025

SUMMARY

The method of directly heating ink by ultraviolet radiation as described above is extremely useful for solving the problems with conventional evaporation-drying inks. In order to perform printing in higher quality, it is desired not only to simply heat ink by ultraviolet radiation but also to perform printing with a configuration more suitable for the characteristics of inks. The present disclosure provides a printing method, a printing device, and a printing system capable of solving the above-noted problems.

After filing the application of PCT JP2017-004025, the inventor of the subject application has further conducted elaborate studies on the method of directly heating ink by radiation of energy rays such as ultraviolet rays (hereinafter referred to as fast-drying method). The inventor has further confirmed the effects achieved by this method and examined possible side effects and measures against them.

More specifically, when the solvent in ink is evaporated by such a method, ink can be dried rapidly for an extremely short time, because the ink alone is directly heated. In this case, however, the rapid evaporation of the solvent may affect the quality of printing, depending on the conditions during heating and the characteristics of ink. For example, when ink is dried by the fast-drying method, the solvent in the ink may blow out because the temperature of the ink rapidly increases. As a result, for example, the colorant in the ink, such as pigment, may become disordered. When an ink that leaves resin on a medium during fixing, such as an ink including binder resin, is used, the planarity of the surface (print surface) of the ink on a medium may be reduced due to bubbles or pores produced during evaporation of the solvent. This may lead to a matted print surface and make it difficult to perform printing with high gloss.

In this respect, the inventor of the subject application has conceived of further performing a process for increasing the gloss of a layer of ink in printing by the fast-drying method, in addition to performing printing while preventing bleeding by the fast-drying method. The inventor has found that this process can prevent bleeding appropriately and provide a precise and vivid image with high gloss, for example, when printing is performed at high speed with evaporation-drying ink. The inventor of the subject application has further conducted elaborate studies and found the features necessary for achieving the above-noted effects. This finding has led to completion of the present disclosure.

In order to solve the above-noted problem, the present disclosure provides a printing method of performing a printing on a medium using a color ink, which is an ink having a color. The printing method includes: a color ink layer forming step of ejecting the color ink to the medium to form a layer of the color ink on the medium; and a glossing step of performing a process for increasing a gloss of the layer of the color ink. The color ink includes a colorant and a solvent, and the color ink generates heat by radiation of an energy ray. In the color ink layer forming step, the energy ray is emitted to the color ink adhering to the medium to remove by evaporation at least a part of the solvent included in the color ink. In the glossing step, the gloss of the layer of the color ink is increased after at least a part of the solvent is removed by evaporation.

In such a configuration, for example, the ink that generates heat by radiation of the energy ray is used as a color ink, and the ink can be directly heated. For example, this configuration sufficiently can increase the viscosity of the ink immediately after landing of ink droplets onto a medium and prevent bleeding appropriately. In this case, the printing speed can also be increased appropriately, because it is possible to prevent appropriately bleeding of ink.

In this case, for example, even when the evaporation of the solvent for a short time reduces the planarity of the layer of color ink, the gloss of the layer of color ink is increased in the glossing step, whereby high gloss appropriately can be achieved. Accordingly, for example, a high-gloss, precise and vivid image can be printed appropriately. With such a configuration, for example, even when high-speed printing is performed using evaporation-drying ink, a high-gloss, precise and vivid image can be printed appropriately while bleeding is prevented.

Here, the ink that generates heat by radiation of energy rays refers to, for example, an ink that absorbs energy rays to generate heat. An example of such ink may be an ink including an energy absorber that absorbs energy rays. More specifically, for example, when ultraviolet rays are used as energy rays, ink including an ultraviolet (UV) absorber may be used. Depending on the color and the composition of ink, it is possible to cause the ink to generate heat without adding an energy absorber intentionally. More specifically, for example, when ink includes a colorant (for example, pigment) that sufficiently absorbs energy rays emitted to the ink, the colorant absorbs energy rays to allow the ink to generate heat. In this case, the substance (for example, colorant) that absorbs energy rays to generate heat may also serve the function of an energy absorber.

In the color ink layer forming step, for example, the energy ray is emitted to the color ink adhering to the medium to heat the color ink such that a temperature of the color ink on the medium becomes higher than a temperature of the medium. In this case, the color ink may be heated to a temperature at which the color ink on the medium boils. Such a configuration, for example, can increase the viscosity of the color ink on the medium appropriately for a short time. For example, this can prevent bleeding more appropriately.

Boiling of the color ink on the medium means, for example, that the solvent in the ink boils. Then, in this case, for example, the planarity of the layer of color ink may be likely to decrease due to the boiling of the solvent. In this respect, in such a configuration, since the gloss of the layer of color ink is increased in the glossing step, the effect of the boiling of the color ink, if any, can be reduced appropriately. Accordingly, with such a configuration, for example, the temperature of the color ink can be increased appropriately and sufficiently. For example, this also can prevent bleeding more appropriately.

The color ink may include, for example, a resin or a substance to change into resin. In this case, in the color ink layer forming step, for example, a layer of color ink including a resin is formed on the medium. In this case, the resin included in the ink is, for example, a binder resin. The substance to change into resin refers to, for example, a substance that changes into a resin through a polymerization reaction or the like until the ink is fixed on the medium. When such an ink is used, drying the color ink by radiation of energy rays for a short time may reduce the planarity of the surface of the layer of color ink on the medium due to bubbles or pores produced during evaporation of the solvent. In this respect, in the configuration as described above, the gloss of the layer of color ink is increased in the glossing step. Therefore, even when the planarity of the surface of the layer of color ink is reduced during evaporation of the solvent, the gloss can be appropriately increased subsequently. Accordingly, with such a configuration, for example, when a color ink including a resin or a substance to change into resin is used, glossy printing can be performed appropriately.

The color ink may be, for example, an ink including a pigment as the colorant. Then, in this case, when the color ink is dried by radiation of energy rays for a short time, for example, the pigment may be sparsely bonded on the medium to cause variations of the pigment. This may cause disorder of the pigment on the medium and reduce the gloss of the surface of the layer of color ink. In this respect, in the configuration as described above, the gloss of the layer of color ink is increased in the glossing step. Therefore, even when the pigment on the medium becomes disordered during evaporation of the solvent, the gloss can be appropriately increased subsequently. In such a configuration, therefore, for example, when a color ink including a pigment is used, glossy printing can be performed appropriately.

In the glossing step, for example, a layer of another ink (overcoat layer) to cover the layer of color ink may be formed to increase the gloss of the layer of color ink. In this case, for example, a layer of a light-transmitting ink, which is an ink that allows a light to pass through, may be formed on the layer of the color ink. Such a configuration, for example, can increase the gloss of the layer of color ink appropriately. In this case, increasing the gloss of the layer of color ink means, for example, increasing the gloss of the layer of color ink that is visually recognized together with the layer of light-transmitting ink in a state in which printing is finished.

As the light-transmitting ink, for example, known clear ink can be suitably used. In this case, in forming a layer of light-transmitting ink, it is preferable that a layer of light-transmitting ink be formed such that dots of the light-transmitting ink are sufficiently planarized. The light-transmitting ink may also be, for example, an ink that generates heat by radiation of the energy ray. In this case, it is preferable that the sufficiently planarized layer of light-transmitting ink be foil red by drying the light-transmitting under a condition different from the condition for forming the layer of color ink. More specifically, in this case, for example, in the color ink layer forming step, the energy ray is emitted to the color ink adhering to the medium in a first condition which is preset. Then, in the glossing step, the energy ray is emitted to the light-transmitting ink adhering to the medium in a second condition different from the first condition. The second condition is a condition, for example, under which a temperature increase of the ink is milder than in the first condition. With such a configuration, for example, the light-transmitting ink is dried under a condition milder than for the color ink in forming a layer of color ink, thereby appropriately forming a sufficiently planarized layer of light-transmitting ink.

In the glossing step, for example, pressure may be applied to the layer of light-transmitting ink with a roller to form a sufficiently planarized layer of light-transmitting ink. The light-transmitting ink may be, for example, a thermoplastic ink. In this case, in the glossing step, for example, a heat roller is used to apply a pressure to the layer of light-transmitting ink on the medium while heating the layer, thereby planarizing the layer of the light-transmitting ink. With such a configuration, for example, a sufficiently planarized layer of light-transmitting ink can be formed appropriately. This can also increase, for example, the gloss of the layer of color ink appropriately.

In the glossing step, a layer of light-transmitting ink may not be formed, and, for example, the layer of color ink may be directly planarized using a thermoplastic ink as the color ink. In this case, in the glossing step, for example, a heat roller is used to apply a pressure to the layer of color ink on the medium while heating the layer, thereby planarizing the layer of color ink. Such a configuration also can increase, for example, the gloss of the layer of color ink appropriately.

When a thermoplastic ink is used as color ink, for example, the gloss of the layer of color ink may be increased by transferring the layer of color ink to another medium. In this case, in the color ink layer forming step, for example, the layer of color ink is formed on a first medium. Then, in the glossing step, the layer of color ink on the first medium is transferred to a second medium different from the first medium. During transfer, a pressure for transferring the layer of color ink from the first medium to the second medium is applied while at least the layer of color ink is heated in a state in which the first medium and the second medium overlap each other with the layer of color ink interposed therebetween. Such a configuration, for example, can appropriately planarize the layer of color ink to be transferred to the second medium. This can also increase, for example, the gloss of the layer of color ink appropriately.

Another aspect of the present disclosure may provide a printing device and a printing system having the same features as described above. In these cases, for example, the similar effects as described above can be achieved.

According to the present disclosure, for example, a high-gloss, precise and vivid image can be printed appropriately.

BRIEF DESCRIPTION OF THE DRAWINGS

FIGS. 1A and 1B are diagrams illustrating an exemplary printing device 10 according to an embodiment of the present disclosure, in which FIGS. 1A and 1B are a top view and a side cross-sectional view, respectively, of an exemplary configuration of the main part of the printing device 10.

FIGS. 3A to 3G are diagrams illustrating an example of printing operation in a case where fast-drying latex ink is used as color ink and schematically illustrate operation in each step during printing.

DESCRIPTION OF EMBODIMENTS

Figure 1A:
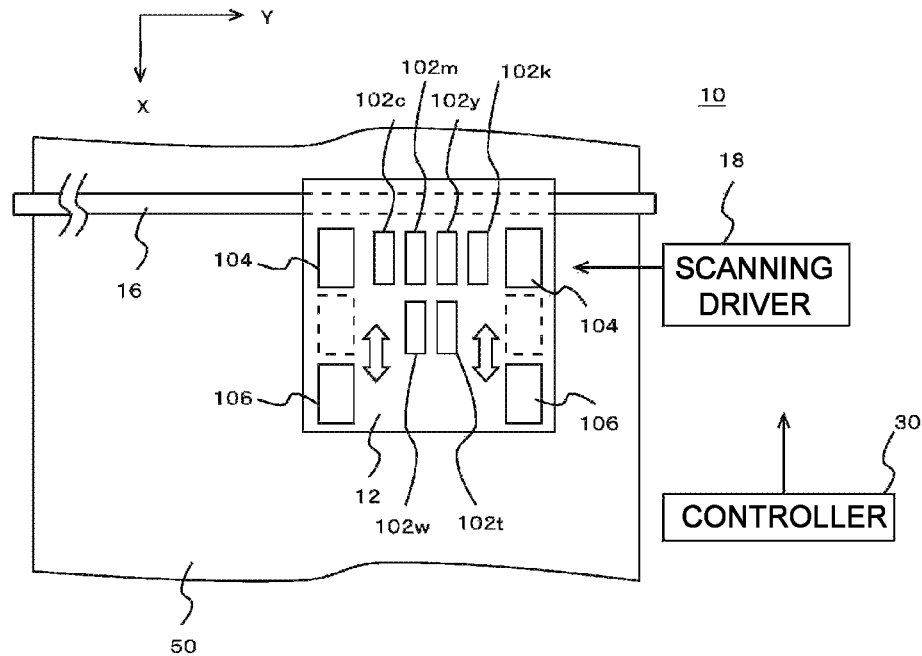
Figure 1B:
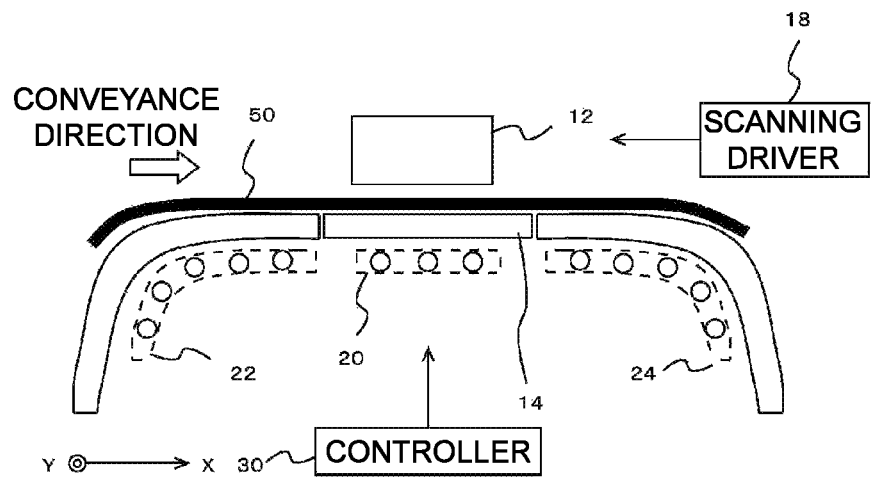

Embodiments of the present disclosure will be described below with reference to the figures. FIGS. 1A and 1B illustrate an exemplary printing device 10 according to an embodiment of the present disclosure. FIGS. 1A and 1B are a top view and a side cross-sectional view, respectively, of an exemplary configuration of the main part of the printing device 10.

The printing device 10 may have the same or similar configuration as known printing devices, except for the points described below. For example, the printing device 10 may further include the same or similar components as those in known printing devices, in addition to the components described below. In this example, the printing device 10 is an example of a device included in a printing system. More specifically, in the case of the configuration illustrated in FIGS. 1A and 1B, the printing device 10 functions singly as a printing system. In a modified configuration of the printing system, for example, a device other than the printing device 10 may be further incorporated, and the configuration including those devices may be considered as a printing system.

The printing device 10 in this example will be described in detail below. In this example, the printing device 10 is an inkjet printer that performs inkjet printing on a medium 50 to be printed and includes a head 12, a platen 14, a guide rail 16, a scanning driver 18, a print heater 20, a pre-heater 22, and an after heater 24. The head 12 ejects ink to a medium 50 and has a plurality of inkjet heads and a plurality of ultraviolet (UV) light sources. More specifically, as illustrated in FIG. 1A, in this example, the head 12 has an inkjet head 102c, an inkjet head 102m, an inkjet head 102y, an inkjet head 102k, an inkjet head 102w, and an inkjet head 102t, as a plurality of inkjet heads. Among these, the inkjet head 102c, the inkjet head 102m, the inkjet head 102y, and the inkjet head 102k (hereinafter referred to as inkjet heads 102c to 102k) are an example of inkjet heads ejecting color ink, which is an ink having color. In this case, the color ink refers to, for example, ink for coloring for representing an image to be printed. The color ink may be considered, for example, as inks of basic colors (process colors) for use in full-color printing.

More specifically, the inkjet head 102c ejects cyan (C) ink. The inkjet head 102m ejects magenta (M) ink. The inkjet head 102y ejects yellow (Y) ink. The inkjet head 102k ejects black (K) ink. In this example, as illustrated in the figure, the inkjet heads 102c to 102k are aligned in an X direction preset in the printing device 10 and disposed side by side in a Y direction orthogonal to the X direction. In this case, the X direction is a direction parallel to the feeding direction (conveyance direction) in which a medium 50 is fed relative to the head 12. The Y direction is a direction parallel to the main scanning direction in which the head 12 is moved relative to a medium 50 during main scanning operation. In this case, the main scanning operation refers to, for example, the operation of ejecting ink while moving in the main scanning direction.

In this example, evaporation-drying ink is used as color ink to be ejected from the inkjet heads 102c to 102k. Ink that generates heat per se by ultraviolet radiation is used as the evaporation-drying ink. In this case, for example, ultraviolet rays are emitted to the ink adhering to the medium 50 to allow the ink to dry appropriately for a short time. The ink can be dried appropriately, for example, before bleeding of ink occurs.

The color ink for use in this example can be considered, for example, as ink that includes a colorant and a solvent and generates heat by radiation of energy rays. In this case, generating heat by radiation of energy rays means, for example, absorbing energy rays to generate heat. For example, an ink containing an energy absorber that absorbs energy rays can be used as such an ink. As in this example, when ultraviolet rays are used as energy rays, for example, an ink containing a UV absorber may be used. Depending on the color and the composition of ink, an energy absorber is not added intentionally to allow the ink to generate heat. More specifically, for example, when the ink contains a colorant (for example, pigment) that sufficiently absorbs energy rays emitted to the ink, it is considered that the colorant absorbs energy rays to cause the ink to generate heat. The features of the color ink for use in this example will be described in more detail later.

The inkjet head 102w and the inkjet head 102t eject inks of colors other than the basic colors C, M, Y, and K. Among those, the inkjet head 102w ejects white ink. The inkjet head 102t ejects clear ink, which is an ink of clear color. In this case, the clear color refers to, for example, colorless transparent color. Colorless ink means, for example, ink considered as being colorless in design. The clear ink may also be considered as, for example, ink that does not contain a colorant such as pigment. In this example, the clear ink is an example of light-transmitting ink, which is an ink that allows light to pass through.

In this example, the inkjet head 102w and the inkjet head 102t are disposed so as to be displaced from the inkjet heads 102c to 102k in the X direction. The inkjet head 102w and the inkjet head 102t are aligned in the X direction and disposed side by side in the Y direction. In this example, white ink and clear ink ejected from the inkjet head 102w and the inkjet head 102t are also evaporation-drying inks that generate heat per se by ultraviolet radiation.

A plurality of UV light sources in the head 12 generate ultraviolet rays to cause ink to generate heat. In this example, as illustrated in FIG. 1A, the head 12 includes a plurality of UV light sources 104 and a plurality of UV light sources 106, as a plurality of UV light sources. Ultraviolet light-emitting diodes (UV LEDs) (UV LED radiation means) are used as the UV light sources 104 and the UV light sources 106. With such a configuration, for example, ultraviolet rays to be emitted to ink can be generated appropriately with high efficiency.

The UV light sources 104 emit ultraviolet rays to the ink ejected by the inkjet heads 102c to 102y. The UV light sources 104 are aligned with the inkjet heads 102c to 102y in the X direction and are disposed on one side and the other side of the arrangement of the inkjet heads 102c to 102y in the Y direction. The UV light source 104 emits ultraviolet rays to the ink adhering to the medium 50 in each main scanning operation. In this case, for example, ultraviolet rays are emitted from the UV light source 104 on the rear side of the inkjet heads 102c to 102y in the moving direction of the head 12, so that color ink is radiated with ultraviolet rays immediately after landing on the medium 50, whereby the viscosity of ink can be sufficiently increased before bleeding of ink occurs. This example thus can appropriately prevent, for example, bleeding of color ink.

Here, the color ink is dried by the UV light source 104, for example, to a degree that sufficiently increases the density of ink in a range in which the purpose of preventing bleeding is achieved. Thus, ultraviolet radiation by the UV light source 104 can be considered as, for example, the operation of emitting ultraviolet rays to color ink adhering to the medium 50 to remove by evaporation at least part of a solvent included in the color ink. In this example, ink can be directly heated by drying ink using the UV light source 104, for example, unlike a case where ink is indirectly heated by heating the medium 50 with a general heater. This example therefore, for example, can sufficiently increase the viscosity of color ink for a short time immediately after landing on the medium 50 and appropriately prevent bleeding. In this case, since bleeding of ink is prevented appropriately, for example, the speed of printing can also be increased appropriately.

When ink is heated by the UV light source 104, color ink is directly heated, for example, such that the temperature of the color ink on the medium 50 becomes higher than the temperature of the medium 50. More specifically, in this example, for example, color ink is heated to the temperature at which the color ink on the medium 50 boils. In this case, boiling of the color ink on the medium 50 means, for example, that the solvent in the ink boils. This configuration, for example, can increase the viscosity of color ink on the medium 50 more appropriately for a short time. For example, this also can prevent bleeding more appropriately. In this case, for example, ink can be heated efficiently, which leads to, for example, reduction of power consumption necessary for drying ink.

The UV light sources 106 emit ultraviolet rays to the ink ejected by the inkjet head 102w and the inkjet head 102t. The UV light sources 106 are displaced from the inkjet head 102w and the inkjet head 102t in the X direction and disposed on one side and the other side of the arrangement of the inkjet head 102w and the inkjet head 102t in the Y direction. In this configuration, the UV light source 106 emits ultraviolet rays to the ink ejected by the inkjet head 102w or the inkjet head 102t in each main scanning operation, for example, in the subsequent main scanning operation. In such a configuration, ink can be dried, for example, after dots of ink are sufficiently planarized on the medium 50. For example, when a layer of white ink or a layer of clear ink is formed, the formed layer of ink is sufficiently planarized with high gloss.

Preferably, a plurality of UV light sources 106 can be changed in position in the X direction, for example, as depicted by the arrows in the figure. This configuration enables, for example, adjustment of the time from landing of ink to radiation of ultraviolet rays. Accordingly, for example, when a layer of white ink or a layer of clear ink is formed, the planarizing time for planarizing dots of ink can be adjusted.

The platen 14 is a table-shaped member for supporting the medium 50 and supports the medium 50 such that the medium 50 is opposed to the head 12. In this example, the platen 14 accommodates the print heater 20, the pre-heater 22, and the after heater 24 inside. The guide rail 16 is a rail member for guiding the movement of the head 12 during main scanning operation.

The scanning driver 18 drives the main scanning operation and the sub-scanning operation by the printing device 10. During main scanning operation, for example, the scanning driver 18 allows the inkjet heads in the head 12 to eject ink in accordance with an image to be printed while moving the head 12 along the guide rail 16. The region of the medium 50 opposed to the head 12 is changed by driving the sub-scanning operation in the interval between main scanning operations. In this case, the sub-scanning operation refers to, for example, the operation of moving the medium 50 in the sub-scanning direction relative to the head 12. In this example, the sub-scanning direction is a direction parallel to the X direction. The scanning driver 18, for example, drives a not-illustrated roller to move the medium 50 in the conveyance direction parallel to the sub-scanning direction, thereby driving the sub-scanning operation.

The print heater 20 heats the medium 50 at a position opposed to the head 12. The use of the print heater 20 enables, for example, more efficient heating of the ink on the medium 50. When the heating temperature in the print heater 20 is high, for example, the inkjet heads in the head 12 are heated, which is likely to cause nozzle clogging or other problems. In this respect, in this example, ink can be efficiently heated using the UV light source 104 as described above. The heating temperature by the print heater 20 is preferably set to a sufficiently low temperature, for example, for the purpose of reducing the effect of the environment temperature. More specifically, the temperature for heating the medium 50 by the print heater 20 is, for example, 40° C. or lower, preferably 35° C. or lower. This configuration, for example, can appropriately reduce the effect of environment temperature while preventing nozzle clogging or other problems.

The pre-heater 22 heats the medium 50 upstream from the head 12 in the conveyance direction. The pre-heater 22 can be used to appropriately adjust the initial temperature of the medium 50 before the medium 50 reaches the position of the head 12. In this case, the temperature for heating the medium 50 by the pre-heater 22 is preferably set to a sufficiently low temperature (for example, 40° C. or lower, preferably 35° C. or lower), for example, for the purpose of reducing the effect of environment temperature.

The after heater 24 is a heater (post-heating heater) for heating the medium 50 downstream from the head 12 in the conveyance direction. The use of the after heater 24 ensures that ink is dried, for example, until the printing is finished. The heating temperature of the after heater 24 may be set to a high temperature to some degree in a range equal to or lower than the heat-resistant temperature of a medium 50 to be used. More specifically, the temperature for heating a medium 50 by the after heater 24 is set to, for example, about 30 to 50° C.

As described above, in this example, ink is dried using the UV light source 104. Thus, all or some of the print heater 20, the pre-heater 22, and the after heater 24 may be omitted depending on the use environment of the printing device 10 and the desired quality of print.

A controller 30 is, for example, a CPU of the printing device 10 for controlling the operation of each portion in the printing device 10. In this example, for example, printing on a medium 50 can be performed appropriately.

In the head 12 in this example, the part including the inkjet heads 102c to 102y and the UV light sources 104 functions as an example of the color ink layer-forming portion. The part including the inkjet head 102t and the UV light sources 106 functions as an example of the glossing portion. The specific configuration of the printing device 10 is not limited to the configuration illustrated in FIGS. 1A and 1B and may be modified in various ways. For example, for inks to be used, inks of the colors red (R), green (G), and blue (B) may be additionally used. As special color inks, inks of various colors, such as pearl colors, metallic colors, fluorescent colors, and phosphorescent colors may be used.

The features of the ink for use in this example will now be described in more detail. As described above, in this example, the inks of colors to be used in the inkjet heads in the head 12 are inks that generate heat by ultraviolet radiation. In this case, an example of the UV light sources 104 and the UV light sources 106 is a UV LED that generates ultraviolet rays in the wavelength region of about 250 to 400 nm. When a UV LED is used, the energy of ultraviolet rays emitted from the UV light source is set such that the integrated value of radiation energy in one pass or a plurality of passes in the multi-pass method is about 300 to 3000 mJ/cm$^2$. In this case, in order to allow ink to generate heat sufficiently in response to such ultraviolet rays, for example, it is preferable to use such an ink that the absorption ratio of ultraviolet rays is 10% or more when a 20 μm-thick layer of ink is formed.

In this case, in order to allow ink to generate heat more efficiently, for example, ink containing a UV absorber that absorbs ultraviolet rays may be used. In this case, preferable examples of the ink may be an ink in which a resin having an organic UV absorber dissolved therein is dispersed in a solvent or an ink having an organic UV absorber directly dissolved in a solvent. For example, a substance colorless transparent or almost colorless transparent that does not affect the color of the ink is preferably used as a UV absorber. More specifically, in this case, for example, it is preferable to use a substance that is almost transparent in the visible light wavelength range and exhibits a large absorption in the vicinity of the emission wavelengths (for example, about 250 to 400 nm) of the UV LED used as the UV light source 104 or the UV light source 106. In this case, the UV LED used as the UV light source 104 or the UV light source 106 may preferably have emission wavelengths equal to or lower than 400 nm and have the maximum emission wavelength in a wavelength range that overlaps the effective absorption wavelengths of the UV absorber.

For example, a variety of substances used as the components of known UV-curable inks may be used as the UV absorber as described above. Such substances may be, for example, a variety of substances used as photopolymerization initiators in radical polymerization. Examples of such substances include acetophenone-based substances, such as benzil dimethylketal (type) 1, α-hydroxyacetophenone (type) 2 to 6, and α-aminoacetophenone (type) 7 to 9; acylphosphine oxide-based photopolymerization initiators, such as monoacylphosphine oxide (MAPO) and bisacylphosphine oxide (BAPO); O-acyloxime-based photopolymerization initiators, such as O-acyloxime 16, 17; oxime ester-based photopolymerization initiators, such as IRGACURE 01 to 02; titanocene-based photopolymerization initiators, such as titanocene; and bimolecular reaction-type photopolymerization initiators such as benzophenone, thioxanthone, and ketocoumarin.

For example, a variety of substances used as photopolymerization initiators in cationic polymerization can be used as the UV absorber. Examples of such substances include onium salt-based substances, such as onium salts 27 to 29; substances of iodonium salts, such as iodonium salt 24, nonionic diaryliodonium salts, triaryliodonium salts, diphenyliodonium salts, and sulfonium salts; and nonionic cationic photopolymerization initiators, such as imide sulfonates and oxime sulfonates. As the UV absorber, for example, cationic polymerizable monomers and oligomers may be used. In this case, for example, epoxy compounds, vinyl ether compounds, and oxetane may be used.

The UV absorber as described above is an example of a substance that functions as a UV absorber when the ink includes another substance in addition to primary components of ink. In this case, the primary components of ink refer to, for example, components for fulfilling the functions of ink, except for the function for heating ink by ultraviolet radiation. However, considering the feature of heating ink by ultraviolet radiation, at least part of the primary components of ink may serve the function as a UV absorber, rather than adding a UV absorber in addition to the primary components of ink. For example, when a carbon pigment is used as a colorant for black ink, the colorant itself has the characteristic of strong absorption for the ultraviolet region. Many pigments for cyan and magenta also have the characteristic of strong absorption for the ultraviolet region. Then, in such a case, another substance may not be added as a UV absorber as long as the colorant sufficiently generates heat by ultraviolet radiation and fulfills the function as UV absorber. To put it more generally, for example, when any (one or more) of the components of ink, including colorant, resin, and solvent, sufficiently absorb ultraviolet rays and generate heat, such components can be considered to function also as UV absorber. In such a case, the ink can be considered to include UV absorber.

The operation of printing using the printing device 10 in this example will now be described in more detail. As described above, in this example, ultraviolet rays are emitted to the color ink ejected from the inkjet heads 102c to 102k immediately after landing of droplets onto a medium 50 to evaporate at least part of the solvent in the ink for a short time. However, in this case, for example, the surface of the layer of color ink becomes disordered due to boiling of the solvent, and the planarity of the layer of color ink may be reduced. In this respect, in this example, a layer of clear ink is formed on the layer of color ink, as will be described later, to increase the gloss in the print result.

More specifically, in this case, printing includes the operation of a color ink layer forming step of ejecting color ink to a medium 50 to form a layer of color ink (colored ink layer) on the medium 50 and the operation of a glossing step of performing a process for increasing gloss of the layer of color ink. In the operation in the glossing step, a layer of clear ink (clear coat layer) is formed on the layer of color ink while dots of clear ink are sufficiently planarized. In this case, the layer of clear ink is an example of the layer of another ink (overcoat layer) covering the layer of color ink. Such a configuration, for example, can increase the gloss of the layer of color ink appropriately. In this case, increasing the gloss of the layer of color ink means, for example, increasing the gloss of the layer of color ink that is visually recognized together with the layer of clear ink in a state in which printing is finished. The operation of the glossing step can be considered as, for example, the operation of increasing the gloss of the layer of color ink after at least part of the solvent is removed by evaporation.

In this case, a variety of known inks can be applied as the color ink. FIGS. 2A to 4D are diagrams illustrating the operations of the color ink layer forming step and the glossing step more specifically and illustrate an example of the printing operation using a variety of color inks.

FIGS. 2A to 2F illustrate an exemplary printing operation in a case where fast-drying water-based pigment ink is used as color ink. FIGS. 2A to 2F schematically illustrate the operation in each step during printing. In this case, the fast-drying ink refers to, for example, ink that generates heat by radiation of energy rays. In the case illustrated in FIGS. 2A to 2F, water-based pigment ink that generates heat by ultraviolet radiation is used as the fast-drying ink. In this case, the water-based pigment ink refers to, for example, water-based ink including a pigment as a colorant.

Figure 2A:
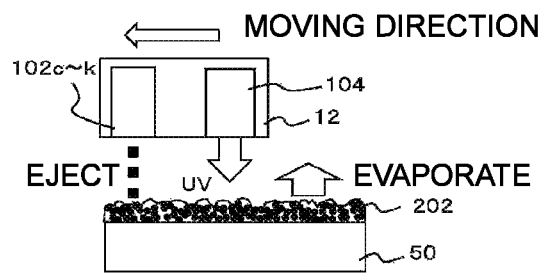
FIGS. 2A to 2F are diagrams illustrating an example of printing operation in a case where fast-drying water-based pigment ink is used as color ink and schematically illustrate operation in each step during printing.

In this example, at least the operations of the color ink layer forming step and the glossing step are performed using the printing device 10 illustrated in FIGS. 1A and 1B, as described above. In this case, in the operation of the color ink layer forming step, for example, as illustrated in FIG. 2A, in each main scanning operation, the UV light source 104 emits ultraviolet rays while the inkjet heads 102c to 102k eject color ink onto a medium 50. At least part of the solvent in the ink thus evaporates immediately after landing of ink droplets, thereby increasing the viscosity of ink. With such a configuration, for example, a colored ink layer 202 that is a layer of color ink can be formed appropriately while bleeding is prevented. However, in this case, as described above, the rapid evaporation of the solvent in the ink may cause, for example, disorder of the pigment on the medium 50 to produce surface roughness of the colored ink layer 202 and make the colored ink layer 202 coarse (matte). Therefore, the gloss of the surface of the colored ink layer 202 is poor when the colored ink layer 202 is merely formed.

Figure 2B:
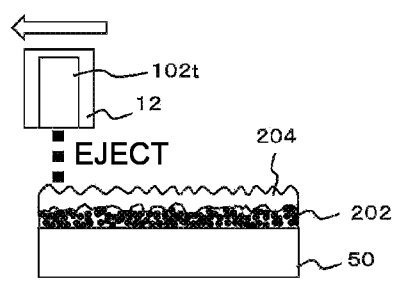

In this respect, in this example, the operation of the glossing step is performed to increase the gloss of the colored ink layer 202. In this case, in the operation of the glossing step, for example, as illustrated in FIGS. 2B to 2D, an overcoat layer 204 that is a layer of ink covering the colored ink layer 202 is formed with clear ink to increase the gloss of the colored ink layer 202. More specifically, in this case, for example, the clear ink used has a similar composition as color ink except that it does not include a colorant, and, for example, as illustrated in FIG. 2B, the clear ink is ejected onto the colored ink layer 202 from the inkjet head 102t to form the overcoat layer 204. In this case, unlike formation of the colored ink layer 202, the ink is not to be dried immediately after ejection of the clear ink. Therefore, after ink droplets land on the colored ink layer 202, the planarization of the dots of the clear ink proceeds while the low viscosity state is kept. Then, in this case, the overcoat layer 204 achieves a planarized surface over time, as illustrated in FIG. 2C. In this example, after the dots of clear ink are sufficiently planarized, for example, as illustrated in FIG. 2D, ultraviolet rays are emitted from the UV light source 106 to dry the overcoat layer 204.

Figure 2E:
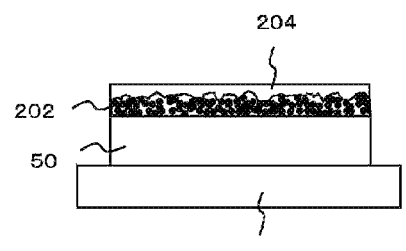
Figure 2C:
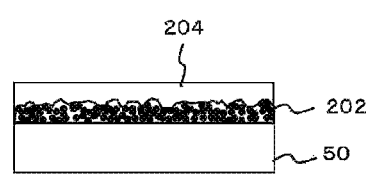

After the overcoat layer 204 is dried by ultraviolet radiation, for example, as illustrated in FIG. 2E, heating is further performed by the after heater 24. Heating by the after heater 24 further ensures evaporation of the solvent components in the colored ink layer 202 and the overcoat layer 204. This also ensures that the colored ink layer 202 and the overcoat layer 204 are fixed on the medium 50.

Figure 2F:
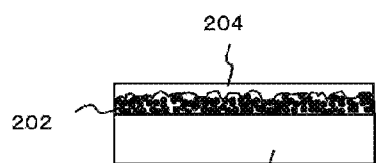
Figure 2D:
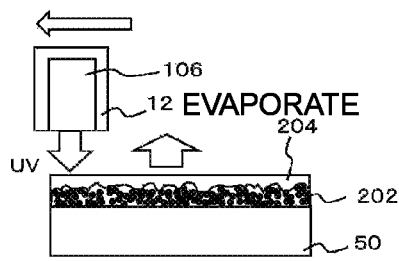

In the operation of printing as described above, for example, the colored ink layer 202 is formed of fast-drying ink, thereby forming a precise and vivid image appropriately while preventing bleeding appropriately. In addition, for example, as illustrated in FIG. 2F, the overcoat layer 204 sufficiently planarized can be formed on the colored ink layer 202. For example, this can appropriately achieve high gloss of an image represented by the colored ink layer 202 even when the surface of the colored ink layer 202 becomes coarse during formation of the colored ink layer 202. Therefore, according to this example, for example, when a color ink including a pigment is used, a high-gloss, precise and vivid image can be printed appropriately.

It is noted that the thickness of the overcoat layer 204 is not limited and may be set according to the desired quality of print, and the like. The clear ink to be used for forming the overcoat layer 204 preferably has, for example, a refractive index equal or close to that of the color ink used for forming the colored ink layer 202. More specifically, the difference in refractive index between the color ink and the clear ink is preferably equal to or less than 0.5. The medium 50 is not limited to any particular types of medium 50, and a variety of media 50 can be used. In view of performing high-gloss printing, for example, plastic glossy films and glossy print paper can be suitably used as a medium 50.

In the operation of drying the overcoat layer 204, it is preferable that the overcoat layer 204 be heated under the condition that the surface of the overcoat layer 204 does not become coarse during evaporation of the solvent. For this, for example, the UV light source 106 for use for drying the overcoat layer 204 may emit ultraviolet rays weaker than the UV light source 104 for use for drying the colored ink layer 202. In this case, the UV light source 106 may be considered, for example, as heating means for drying a layer of ink under a milder condition than the UV light source 104. In this case, the overcoat layer 204 may be dried slowly over time by heating using the print heater 20 (see FIG. 1B) and/or the after heater 24 in combination.

Since the overcoat layer 204 is formed only with a single kind of ink (clear ink), bleeding does not matter during formation of the overcoat layer 204, for example, unlike formation of the colored ink layer 202. It is therefore not necessary to dry the ink for a short time during formation of the overcoat layer 204. Then, in this case, an ink other than fast-drying inks may be used as clear ink to be ejected from the inkjet head 102*t*. In this case, it is preferable that means for fixing the clear ink be used as appropriate in accordance with the characteristics of clear ink to be used.

As described above, a variety of inks other than fast-drying water-based pigment inks can be used as color ink. FIGS. 3A to 3G illustrate an example of the printing operation in a case where fast-drying latex ink is used as color ink. FIGS. 3A to 3G schematically illustrate the operation in each step during printing.

The printing operation illustrated in FIGS. 3A to 3G is the same or similar as the operation illustrated in FIGS. 2A to 2F, except for the points described below. The fast-drying latex ink refers to, for example, fast-drying ink containing latex resin. For example, fast-drying water-based latex ink can be suitably used as fast-drying latex ink. In this case, for example, the ink may include a particulate resin dispersion of a latex resin in an ink vehicle including an evaporation-drying solvent including water as a main component, a colorant (for example, pigment), a disperser, and additives such as a viscosity controlling agent. In this case, a UV absorber may be added to, for example, one or both of the latex resin and the solvent.

Also in this case, in the operation of the color ink layer forming step, for example, as illustrated in FIG. 3A, in each main scanning operation, the UV light source 104 emits ultraviolet rays while the inkjet heads 102*c* to 102*k* eject color ink onto a medium 50. At least part of the solvent in the ink thus evaporates immediately after landing of ink droplets, thereby increasing the viscosity of ink. In this case, as a result of the evaporation of the solvent in the color ink, as illustrated in FIG. 3B, the colored ink layer 202 includes the colorant in the layer of latex resin. In such a case, the surface of the latex resin left on the medium 50 may become rough due to bubbles or pores produced during evaporation of the solvent, resulting in low planarity.

In this respect, also in this case, the operation of the glossing step is performed to increase the gloss of the colored ink layer 202. Also in this case, in the operation of the glossing step, for example, as illustrated in FIGS. 3C to 3E, the overcoat layer 204 is formed with clear ink. In this case, the overcoat layer 204 is formed, for example, in the same or similar manner as the operation illustrated in FIGS. 2B to 2D. Subsequently, as illustrated in FIG. 3F, heating is performed by the after heater 24 in the same or similar manner as the operation illustrated in FIG. 2E. When the printing operation is performed in this manner, for example, as illustrated in FIG. 3G, a sufficiently planarized overcoat layer 204 can be formed appropriately on the colored ink layer 202. Thus, for example, in the case where fast-drying latex ink is used as color ink, a high-gloss, precise and vivid image can also be printed appropriately.

In addition to the inks described above, for example, a fast-drying, colorant-containing resin particle dispersion water-based pigment ink may be used. In this case, the colorant-containing resin particle dispersion water-based pigment ink refers to, for example, a water-based ink including a colorant dispersed in resin particles. The colorant-containing resin particle dispersion water-based pigment ink may be considered, for example, as an ink including a particulate resin dispersion in an ink vehicle including an evaporation-drying solvent including water as a main component, a disperser, and additives such as a viscosity controlling agent. In this case, the particulate resin dispersion includes a colorant, such as a pigment or a dye of individual color C, M, Y, or K, and a particulate resin dispersion of a resin UV-curable resin component (UV-curable resin). Examples of the resin UV-curable resin component include radical, cationic and anionic polymerizable oligomers and monomers to which a UV absorber and/or a cure inhibitor is added in advance. In this case, a UV absorber and/or a UV-curable resin component may be added in a dispersive or dissolved state in a solvent (in a vehicle) to achieve the function of fast-drying ink. For example, a fast-drying, pigment-containing resin ink can be suitably used as the fast-drying, colorant-containing resin particle dispersion water-based pigment ink. In this case, the pigment-containing resin ink refers to, for example, an ink including resin particles (nanopigment-containing resin particles) containing a pigment.

FIGS. 4A to 4D illustrate an example of the printing operation in a case where a pigment-containing resin ink is used as color ink. FIGS. 4A to 4D schematically illustrate the operation in each step during printing. The printing operation illustrated in FIGS. 4A to 4D is the same or similar as the operation illustrated in FIGS. 2A to 2F or FIGS. 3A to 3G except for the points described below.

Figure 4A:
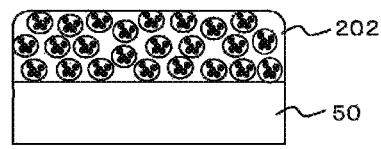
FIGS. 4A to 4D are diagrams illustrating an example of printing operation in a case where pigment-containing resin ink is used as color ink and schematically illustrate operation in each step during printing.
Figure 4B:
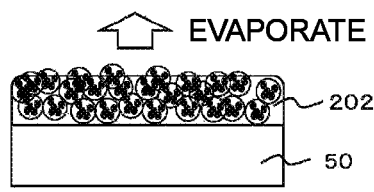
Figure 4C:
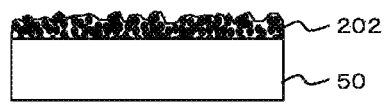
Figure 4D:
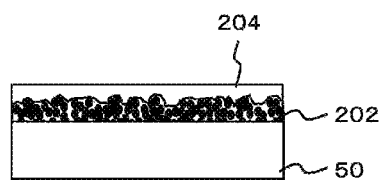

Also in this case, in the operation of the color ink layer forming step, in each main scanning operation, the UV light source 104 (see FIGS. 1A and 1B) emits ultraviolet rays while the inkjet heads 102*c* to 102*k* (see FIGS. 1A and 1B) eject color ink onto a medium 50. At least part of the solvent in the ink thus evaporates immediately after landing of ink droplets, thereby increasing the viscosity of ink. FIG. 4A illustrates a state before the solvent evaporates immediately after landing of ink droplets. FIG. 4B illustrates a state after part of the solvent evaporates by ultraviolet radiation. FIG. 4C illustrates a state after heating and fixing in which the solvent evaporates sufficiently and the colored ink layer 202 is fixed on the medium 50. In this case, as a result of the evaporation of the solvent in the color ink, as illustrated in FIG. 4C, the colored ink layer 202 includes the pigment contained in the resin in the form of coating. Then, in such a case, the surface of the resin left on the medium 50 may become rough due to bubbles or pores produced during evaporation of the solvent, resulting in low planarity. In this respect, also in this case, the operation of the glossing step is subsequently performed to increase the gloss of the colored ink layer 202. In this case, for example, as illustrated in FIG. 4D, the overcoat layer 204 is formed with clear ink in the operation of the glossing step.

Also in this case, the overcoat layer 204 is formed in the same or similar manner as described with reference to FIGS. 2A to 2F and FIGS. 3A to 3G. After the overcoat layer 204 is formed, it is preferable that heating be performed by the after heater 24 in the same or similar manner as described with reference to FIGS. 2A to 2F and FIGS. 3A to 3G. With such a printing operation, a sufficiently planarized overcoat layer 204 can also be formed on the colored ink layer 202. Therefore, for example, when a pigment-containing resin ink is used as color ink, a high-gloss, precise and vivid image can also be printed appropriately.

Various inks other than those described above can be used as color ink. In this case, for example, when a pigment is included as a colorant or when an ink includes a resin or a substance to change into resin, the effect achieved by the overcoat layer 204 may be particularly significant. In this case, the resin included in the ink is, for example, a binder resin. The substance to change into resin is, for example, a substance that changes into resin through a polymerization reaction until the ink is fixed on the medium. The fast-drying latex ink and the fast-drying, colorant-containing resin particle dispersion water-based pigment ink (pigment-containing resin ink) described above are examples of the ink including a resin or a substance to change into resin. Examples of the fast-drying ink including a resin or a substance to change into resin, other than those described above, may include a fast-drying UV-curable resin water-based ink, a fast-drying solvent ink, and a fast-drying SUV ink.

In this case, the fast-drying UV-curable resin water-based ink refers to, for example, a UV-curable resin water-based ink that dries fast. More specifically, the fast-drying UV-curable resin water-based ink includes, for example, a particulate resin dispersion of a resin UV-curable resin component (UV-curable resin) in an ink vehicle including an evaporation-drying solvent including water as a main component, a colorant, a disperser, and additives such as a viscosity controlling agent. In this case, examples of the resin UV-curable resin component include radical, cationic, or anionic polymerizable oligomers and monomers to which a UV absorber and/or a cure inhibitor is added in advance. In this case, a UV absorber and/or a UV-curable resin component is added in a dispersive or dissolved state in a solvent (in a vehicle) to achieve the function of fast-drying ink.

The fast-drying solvent ink refers to, for example, a solvent ink that dries fast. More specifically, the fast-drying solvent ink is, for example, an ink obtained by adding a UV absorber to an ink vehicle including an evaporation-drying solvent including a solvent (organic solvent) as a main component, a binder resin dissolved in the solvent, a pigment colorant dissolved in the solvent, a disperser, and additives such as a viscosity controlling agent. The fast-drying SUV ink refers to, for example, an SUV ink (solvent UV ink) that dries fast. More specifically, the fast-drying SUV ink is, for example, an ink including a UV absorber and a particulate resin dispersion in an evaporation-drying solvent including an organic solvent as a main component. In this case, colloidal or emulsified particles of a resin UV-curable resin component (UV-curable resin component), such as a radical, cationic, or anionic polymerizable oligomer or monomer may be used as the particulate resin dispersion. In the case where the inks as described above are used, the planarity of the surface of the colored ink layer 202 on the medium may be reduced due to bubbles or pores produced during evaporation of the solvent, in the same manner as in the case using the fast-drying latex ink or the fast-drying, colorant-containing resin particle dispersion water-based pigment ink as described above. In this respect, when these inks are used, a sufficiently planarized overcoat layer 204 is also formed to perform high-gloss printing appropriately.

As described above, according to this example, the overcoat layer 204 is formed on the colored ink layer 202 formed of fast-drying ink to appropriately reduce the effect caused by the coarseness of the colored ink layer 202. Printing with high gloss thus can be performed appropriately. More specifically, in this case, for example, in the applications that require high gloss, such as product labels and packages, printing using fast-drying ink can be performed more appropriately.

Various features involved with formation of the overcoat layer 204 will now be described in more detail. As described above, in this example, fast-drying ink is used as color ink to form the colored ink layer 202. In this case, fast-drying ink may also be used as clear ink to form the overcoat layer 204. However, in this case, it is preferable that the condition for drying clear ink during formation of the overcoat layer 204 differ from the condition for drying color ink during formation of the colored ink layer 202 and is set such that the ink is dried more mildly. More specifically, in this case, in the color ink layer forming step of forming the colored ink layer 202, ultraviolet rays are emitted to the color ink adhering to the medium 50 under a preset first condition. Then, in the glossing step of forming the overcoat layer 204, ultraviolet rays are emitted to the clear ink adhering to the medium 50 under a second condition different from the first condition. In this case, the second condition is, for example, such that the temperature increase of ink is milder than in the first condition. With such a configuration, for example, a sufficiently planarized overcoat layer 204 can be formed more appropriately.

The clear ink to be used for forming the overcoat layer 204 may be an ink other than fast-drying inks as described above. In this case, for example, evaporation-drying clear inks other than fast-drying inks, or UV-curable clear inks may be used. In this configuration, after the dots of ink are planarized sufficiently, the overcoat layer 204 is fixed on the colored ink layer 202 to achieve high-gloss printing appropriately.

In order to form a planar (smooth) overcoat layer 204, for example, pressure may be applied with a roller or the like to planarize the overcoat layer 204 more actively, rather than merely allowing dots of ink to be planarized over time. In this case, in the glossing step, for example, a thermoplastic clear ink may be used to form the overcoat layer 204. In this case, for example, a heat roller is used to apply pressure to the overcoat layer 204 while heating the overcoat layer 204, thereby planarizing the overcoat layer 204. With such a configuration, for example, a sufficiently planarized overcoat layer 204 can also be formed appropriately. In addition, for example, the gloss of the colored ink layer 202 can be increased appropriately.

Figure 5A:
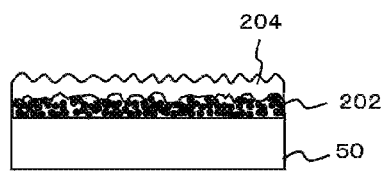
FIGS. 5A and 5B are diagrams illustrating a modification of the operation of the glossing step and schematically illustrate operation during the glossing step.
Figure 5B:
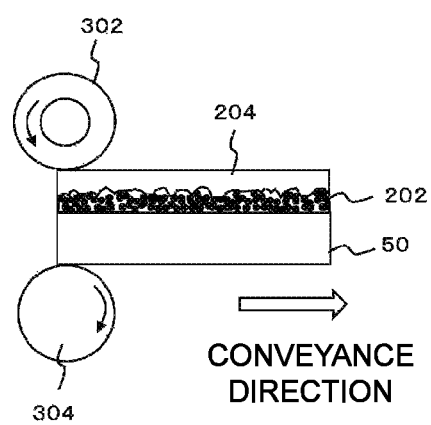

FIGS. 5A and 5B are diagrams illustrating a modification of the operation of the glossing step and illustrate an example of the operation of the glossing step in a case where the overcoat layer 204 is planarized using a heat roller 302. The printing operation illustrated in FIGS. 5A and 5B is the same or similar as the operation illustrated with reference to FIGS. 1A to 4D, except for the points described below.

FIGS. 5A and 5B schematically illustrate the operation during the glossing step. More specifically, FIG. 5A illustrates an example of the state before planarization by the heat roller 302 is performed after the overcoat layer 204 is formed on the colored ink layer 202. FIG. 5B illustrates an example of the state in which planarization by the heat roller 302 is in progress. In this case, for example, the medium 50 having the colored ink layer 202 and the overcoat layer 204 formed thereon is sandwiched between the heat roller 302 and an opposed roller 304, and while the medium 50 is conveyed in a predetermined conveyance direction, the heat roller 302 and the opposed roller 304 rotate to planarize the overcoat layer 204. In this case, the opposed roller 304 refers to, for example, a roller to be used with the heat roller 302 during the planarizing operation by the heat roller 302. A thermoplastic ink is used as clear ink to form the overcoat layer 204. In a state in which the overcoat layer 204 is heated to a temperature equal to or higher than the temperature that softens the clear ink, the heat roller 302 applies a pressure to the heat roller 302 being rotated. Such a configuration can, for example, increase the planarity (smoothness) of the overcoat layer 204 appropriately. For example, this can also increase the gloss of the colored ink layer 202 appropriately.

In the operation of the glossing step described above, the overcoat layer 204 is formed on the colored ink layer 202. However, in the case where planarization using the heat roller 302 is performed, the colored ink layer 202 may be directly planarized in the glossing step, without forming the overcoat layer 204. In this case, for example, a fast-drying thermoplastic ink is used as color ink, and at least part of the solvent is removed by evaporation by ultraviolet radiation. Then, the heat roller 302 or the like applies pressure to the colored ink layer 202 while heating the colored ink layer 202 to planarize the colored ink layer 202. Such a configuration, for example, can also increase the gloss of the colored ink layer 202 appropriately.

Figure 6A:
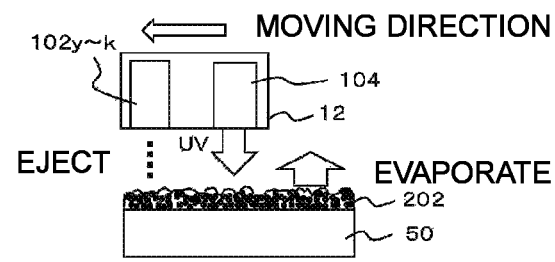
FIGS. 6A to 6C are diagrams illustrating a modification of the operation of the glossing step and schematically illustrate operation in each step during printing.
Figure 6B:
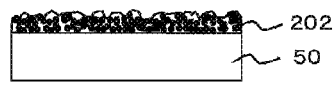
Figure 6C:
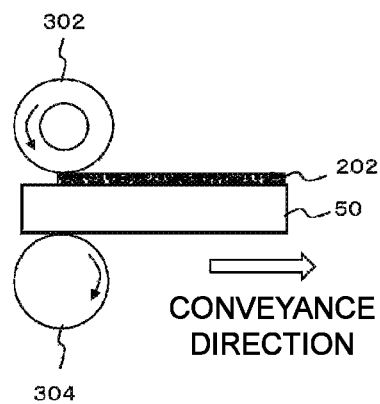

The operation of the glossing step using the heat roller 302 or the like will now be described in more detail. FIGS. 6A to 6C are diagrams illustrating a modification of the operation of the glossing step and illustrate an example of the operation in a case where the colored ink layer 202 is directly planarized using the heat roller 302. FIGS. 6A to 6C schematically illustrate the operation in each step during printing. The printing operation illustrated in FIGS. 6A to 6C is the same or similar as the operation illustrated with reference to FIGS. 1A to 5B, except for the points described below. In this modification, for example, an organic resin film, such as polyethylene or polypropylene, can be suitably used as the medium 50.

FIG. 6A illustrates an example of the operation of the color ink layer forming step performed before the glossing step. In this case, for example, the colored ink layer 202 is formed on the medium 50 in the same or similar manner as described with reference to FIGS. 1A to 5B, except that a fast-drying thermoplastic ink is used. More specifically, also in this case, in each main scanning operation, the UV light source 104 emits ultraviolet rays while the inkjet heads 102*c* to 102*k* eject color ink onto the medium 50. At least part of the solvent in the ink thus evaporates immediately after landing of ink droplets, thereby increasing the viscosity of ink.

FIG. 6B illustrates a state immediately after the colored ink layer 202 is formed. In this case, the state immediately after the colored ink layer 202 is formed refers to, for example, a state before planarization by the heat roller 302 is performed in the glossing step after the colored ink layer 202 is formed. In this case, as illustrated in the figure, effects by evaporation of the solvent for a short time (for example, effects by bumping and vapor blowout) may produce roughness on the surface of the colored ink layer 202 to increase the coarseness. In this respect, in this modification, in the glossing step, for example, as illustrated in FIG. 6C, the medium 50 is sandwiched between the heat roller 302 and the opposed roller 304 to planarize the colored ink layer 202. In this case, heating is performed by the heat roller 302 to melt or soften the thermoplastic resin in the color ink, and pressure is applied in this state to planarize the colored ink layer 202. With such a configuration, for example, the colored ink layer 202 can be planarized appropriately. This also can increase, for example, the gloss of the colored ink layer 202 appropriately.

Here, the planarizing process using the heat roller 302 can be performed in the same or similar manner as a known calendering process. In this case, calendering is, for example, a process for applying gloss or improving smoothness by passing an object through between smooth rollers. In this case, the heat roller 302 can be considered as, for example, a thermo-press roller for calendering. The colored ink layer 202 may be planarized not only by heating and pressing using the heat roller 302 but also by any other methods capable of heating and pressing. In this case, for example, the colored ink layer 202 may be brought into pressure contact by thermocompression bonding means via a film belt. Also in this case, pressure can be applied to the softened color ink to planarize the colored ink layer 202 appropriately.

The thermoplastic ink refers to, for example, an ink that exhibits plasticity when being heated to a predetermined temperature or higher after being fixed on the medium 50. An example of such a thermoplastic ink is an ink including 10% by weight or more (preferably, 30% by weight or more) of a thermoplastic resin component (low-temperature thermoplastic resin), which is a resin component exhibiting thermoplasticity, in the solid content of the ink. In this case, the solid content of the ink is a solid product left on the medium 50 after the solvent is removed by evaporation. Examples of such a solid content may include colorant and resin component. For example, a resin exhibiting thermoplasticity at low temperatures, such as wax, can be suitably used as the thermoplastic resin. Examples of such wax include natural waxes and synthetic waxes having a melting point (softening point) of 130° C. or lower and softening at relatively low temperatures. The melting point of the wax is preferably 100° C. or lower, further preferably 80° C. or lower. Preferable examples of the low-temperature thermoplastic resin include Carnauba wax, Fischer-Tropsch wax, paraffin wax, Sasolwax, polyethylene wax, synthetic polyester wax, and polypropylene wax.

The color ink used in this modification is a thermoplastic ink and also a fast-drying ink (thermoplastic fast-drying ink) because it contains, for example, a UV absorber. More specifically, an example of such a color ink is an ink that includes a pigment as colorant and generates heat by ultraviolet radiation (thermoplastic UV fast-drying pigment ink). More specific examples of the ink include thermoplastic UV fast-drying pigment ink, thermoplastic fast-drying solvent ink, thermoplastic fast-drying water-based latex ink, thermoplastic fast-drying UV-curable water-based ink, and thermoplastic fast-drying SUV ink.

In this case, the thermoplastic fast-drying solvent ink refers to a solvent ink that is thermoplastic and dries fast. The thermoplastic fast-drying solvent ink is, for example, an ink including an evaporation-drying solvent including an organic solvent as a main component, a colorant, a disperser, additives such as a viscosity controlling agent, and a low-temperature thermoplastic resin as described above. The thermoplastic fast-drying solvent ink may further include a resin component including a binder resin having a softening temperature higher than that of the low-temperature thermoplastic resin, as necessary. In this case, a UV absorber may be added to, for example, one or both of the resin component and the solvent. Also in this case, for example, as described above, the colorant can be considered as a UV absorber, given the UV-absorbing characteristics of the colorant itself. The colorant can be considered as a UV absorber also in the ink described below.

The thermoplastic fast-drying water-based latex ink refers to a water-based latex ink that is thermoplastic and dries fast. The thermoplastic fast-drying water-based latex ink includes, for example, a particulate resin dispersion of a natural or synthetic latex resin and a component of a low-temperature thermoplastic resin in an ink vehicle including an evaporation-drying solvent including water as a main component, a colorant, a disperser, and additives such as a viscosity controlling agent. In this case, a UV absorber may be added to, for example, one or both of the latex resin and the solvent. In the thermoplastic fast-drying water-based latex ink, a colorant may be mixed in the latex resin in advance.

The thermoplastic fast-drying UV-curable water-based ink refers to a UV-curable water-based ink that is thermoplastic and dries fast. The thermoplastic fast-drying UV-curable water-based ink includes, for example, a predetermined particulate resin dispersion and a low-temperature thermoplastic resin component in a dissolved or disperse state in an ink vehicle including an evaporation-drying solvent including water as a main component, a colorant, a disperser, and additives such as a viscosity controlling agent. In this case, examples of the particulate resin dispersion may include UV-curable resin components (UV-curable resins) such as radical, cationic, and anionic polymerizable oligomers and monomers to which a UV absorber and/or a cure inhibitor is added in advance. In this case, the UV absorber and/or the UV-curable resin component may be added in a dispersive or dissolved state also to the solvent.

The thermoplastic fast-drying SUV ink refers to an SUV ink that is thermoplastic and dries fast. The thermoplastic fast-drying SUV ink includes, for example, a UV absorber and a UV-curable resin (UV-curable resin component) and a low-temperature thermoplastic resin in an evaporation-drying solvent including an organic solvent as a main component. In this case, examples of the UV-curable resin include radical, cationic, and anionic polymerizable oligomers and monomers. A fast-drying thermoplastic ink other than those described above may be used as the color ink to be used in this modification. Depending on the desired quality in printing, an ink that is not merely plastic but is thermally fused may be used.

A specific configuration for performing the operation of the glossing step using the heat roller 302 will now be described. When the operation of the glossing step is performed using the heat roller 302, for example, as illustrated in FIGS. 6A to 6C, printing may be performed by performing transfer by pressing with the heat roller 302 (transfer method), instead of performing printing directly on the medium 50 (direct printing method) as described above. An example of the configuration of the printing device 10 by each method will now be described below.

Figure 7:
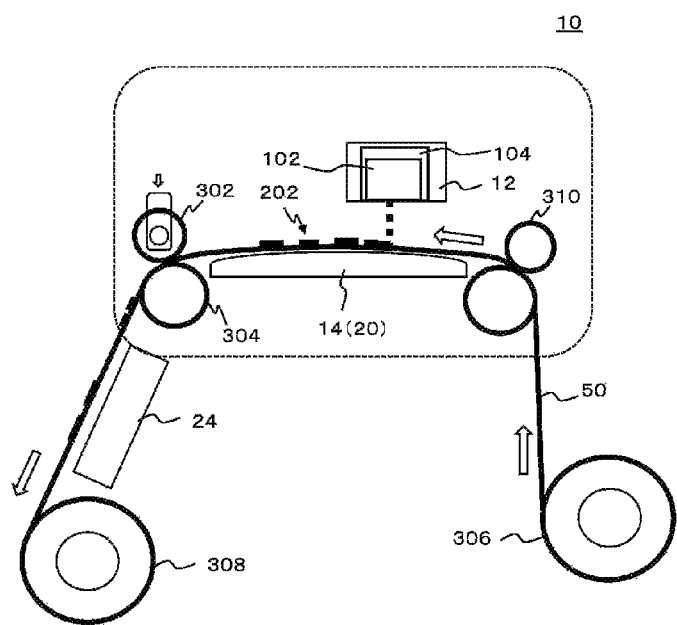
FIG. 7 is a diagram illustrating a modified configuration of the printing device 10.

FIG. 7 is a diagram illustrating a modified configuration of the printing device 10 and illustrates an example of the configuration of the printing device 10 in a case where the operation of the glossing step is performed by the direct printing method using the heat roller 302. In FIG. 7, the configuration denoted by the same reference numerals as in FIGS. 1A to 6C may have the same or similar features as in the configuration in FIGS. 1A to 6C, except for the points described below.

When printing is performed by this method, for example, glossy label paper for label printing (label paper) can be suitably used as the medium 50. In the example of the printing operation described below, for example, a plastic film that exhibits a significant effect of increasing gloss is used as the medium 50. More specifically, in the configuration illustrated in FIG. 7, for example, a flexible packaging film such as a polypropylene film is used as the medium 50. In this case, the printing device 10 can be considered as, for example, a fast-drying ink flexible packaging printer that performs printing for flexible packaging using fast-drying ink. In this modification, for example, a thermoplastic fast-drying water-based latex ink, which is a safe ink, is used as color ink. A roll-shaped medium 50 (roll medium) wound into a roll before and after printing is used as the medium 50.

In the configuration illustrated in FIG. 7, the printing device 10 includes the head 12, the platen 14, the print heater 20, the after heater 24, the heat roller 302, the opposed roller 304, a medium feeder 306, a medium winder 308, and a conveyance roller 310. The head 12 includes the inkjet head 102 and the UV light source 104. The printing device 10 may further include the same or similar configuration as the printing device 10 illustrated in FIGS. 1A and 1B, in addition to the configuration illustrated in the figure. For example, although not illustrated in FIG. 7, the printing device 10 illustrated in FIG. 7 also includes, for example, the scanning driver 18 and the controller 30. The head 12 includes an inkjet head for color ink as the inkjet head 102. In this case, the inkjet head for color ink is, for example, an inkjet head identical or similar to the inkjet heads 102c to 102k in the head 12 illustrated in FIG. 1A. When a full-color image is to be printed, for example, inkjet heads for four colors C, M, Y, and K are necessary as inkjet heads for color ink. However, FIG. 7 illustrates one inkjet head 102 for simplicity of illustration.

In this configuration, the heat roller 302 is a heat press roller for calendering. A medium 50 to be calendered is sandwiched between the opposed roller 304 and the heat roller 302. The medium feeder 306 is a part that successively supplies the medium 50 before printing. The medium feeder 306 holds the medium 50 wound in a roll and successively supplies the medium 50 as the printing operation proceeds. The medium winder 308 is a part that winds the medium 50 into a roll after printing. The conveyance roller 310 conveys the medium 50 in a predetermined conveyance direction. In this modification, the head 12 reciprocates in the direction vertical to the drawing sheet to execute main scanning operation (printing operation). In this case, every time main scanning operation is performed, the conveyance roller 310 intermittently conveys the medium 50 to execute sub-scanning operation.

In this case, a predetermined image is printed on the medium 50 supplied from the medium feeder 306, using the inkjet head 102 in the head 12 with a thermoplastic fast-drying water-based latex ink. Immediately after landing of ink droplets onto the medium 50 (immediately after printing), the UV light source 104 emits ultraviolet rays. This heats the ink on the medium 50 instantaneously and evaporates the solvent, thereby fixing and drying the ink. Then, in this case, the colored ink layer 202 is formed on the medium 50 where it passes through the head 12, as illustrated in the figure.

The colored ink layer 202 formed on the medium 50 is then planarized by calendering with the heat roller 302. In this case, for example, while heating is performed by the heat roller 302 at low temperatures approximately equal to or lower than 80° C., the medium 50 passes through between the heat roller 302 and the opposed roller 304 to be calendered while the thermoplastic ink forming the colored ink layer 202 is softened. In this case, the surface of the image represented by the colored ink layer 202 is planarized and glossed through this calendering. For example, when a solvent residue is left in the ink on the medium 50, the ink is dried sufficiently by heating with the after heater 24. Subsequently, for example, the medium 50 cooled sufficiently is wound by the medium winder 308. The printing step is thus finished. Such a configuration also can increase the gloss of the colored ink layer 202 appropriately.

As described above, when the operation of the glossing step is performed using the heat roller 302, printing may be performed by the transfer method. In this case, the transfer method refers to, for example, a method for increasing the gloss of the colored ink layer 202 by transferring the colored ink layer 202 to another medium. In this case, in the color ink layer forming step, for example, the colored ink layer 202 is formed on a first medium. Then, in the glossing step, the colored ink layer 202 on the first medium is transferred to a second medium. During transfer, a pressure for transferring the layer of color ink from the first medium to the second medium is applied while at least the colored ink layer 202 is heated in a state in which the first medium and the second medium overlap each other with the colored ink layer 202 interposed therebetween. This configuration, for example, can also increase the gloss of the colored ink layer 202 appropriately. More specifically, the printing operation by the transfer method may be performed, for example, using the printing device 10 having the configuration illustrated in FIG. 8 and FIG. 9.

Figure 8:
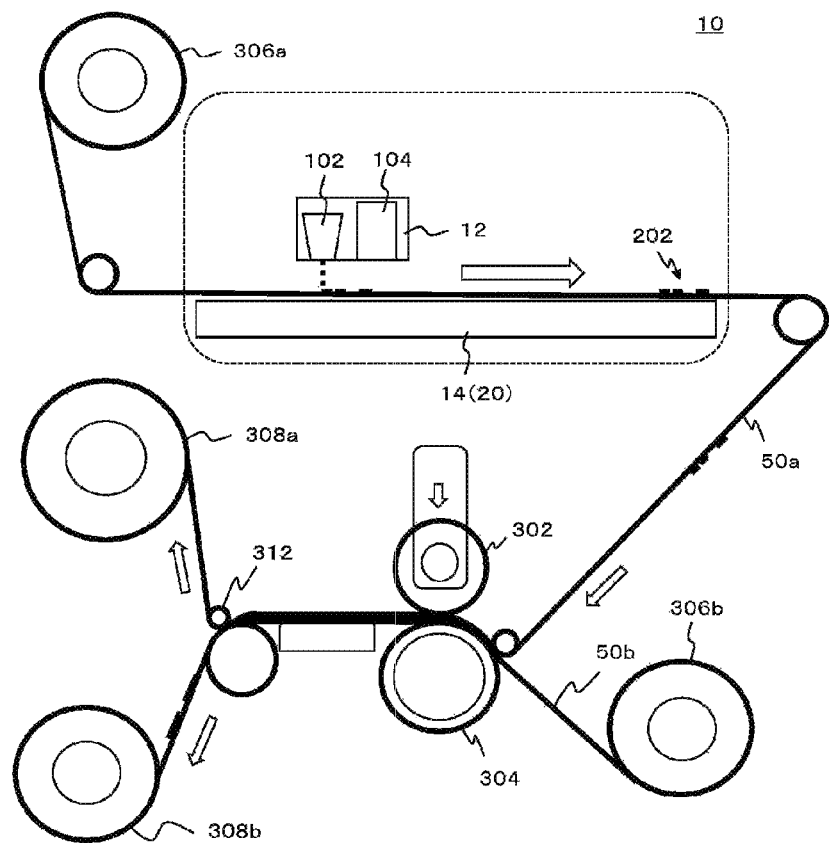
FIG. 8 is a diagram illustrating a further modified configuration of the printing device 10.

FIG. 8 is a diagram illustrating a further modified configuration of the printing device 10 and illustrates an example of the configuration of the printing device 10 in a case where the operation of the glossing step is performed by the transfer method using the heat roller 302. In FIG. 8, the configuration denoted by the same reference numerals as in FIGS. 1A to 7 may have the same or similar features as the configuration in FIGS. 1A to 7, except for the points described below.

In this case, the printing device 10 performs printing using a medium 50a serving as a transfer medium and a medium 50b serving as a transfer target medium. In this case, the medium 50a is an example of the first medium. The medium 50b is an example of the second medium. The same or similar medium 50 as a known transfer medium can be suitably used as the medium 50a. It is preferable to use a medium 50a with weak adhesion to thermoplastic ink used as color ink. In this case, weak adhesion to thermoplastic ink means, for example, that the adhesion is weaker than the adhesion of the thermoplastic ink to the transfer target medium 50b. More specifically, films of polypropylene, polyethylene, silicone rubber, fluoro rubber, polyimides, and the like can be suitably used as the medium 50a. For example, a medium on which printing is difficult by the direct printing method can be used as the medium 50b. More specifically, for example, a medium (for example, seal paper) that is swollen when impregnated with a solvent such as water to possibly cause curling and/or cockling can be used as the medium 50b. Also in such a case, the colored ink layer 202 is transferred after evaporation of the solvent, whereby high-gloss printing can be performed appropriately on the medium 50b while the effect of impregnation with the solvent is eliminated or reduced.

In the configuration illustrated in FIG. 8, the printing device 10 includes the head 12, the platen 14, the print heater 20, the heat roller 302, the opposed roller 304, a medium feeder 306a, a medium winder 308a, a medium feeder 306b, a medium winder 308b, and a separation roller 312. The head 12 includes the inkjet head 102 and the UV light source 104.

Here, the printing device 10 illustrated in FIG. 8 is, for example, a fast-drying label printer that performs label printing by transfer using a fast-drying ink. In FIG. 8, the printing device 10 has a line configuration (line printer method). In this case, the line configuration refers to, for example, a configuration that includes an inkjet head longer in the longitudinal direction than the width of the medium and performs printing without performing main scanning operation by setting the longitudinal direction of the inkjet head parallel to the width direction of the medium. Then, in this case, the UV light source 104 in the head 12 may be disposed downstream of the inkjet head 102 in the conveyance direction of the medium 50. With such a configuration, for example, printing using a fast-drying ink can be performed appropriately in the line configuration. In a further modified configuration of the printing device 10, the printing device 10 illustrated in FIG. 8 may be modified into a serial configuration (serial method) that performs main scanning operation. In this case, for example, a head 12 having the same or similar configuration as the head 12 illustrated in FIGS. 1A and 1B or FIG. 7 may be used as the head 12. In a further modified configuration of the printing device 10, the printing device 10 illustrated in FIGS. 1A and 1B or FIG. 7 may be changed to the line configuration.

In the configuration illustrated in FIG. 8, the medium feeder 306a and the medium winder 308a are a medium feeder (transfer medium feeder) and a medium winder (transfer medium winder), respectively, for a medium 50a. The medium feeder 306b and the medium winder 308b are a medium feeder (label paper feeder) and a medium winder (label paper winder), respectively, for a medium 50b. In this configuration, the opposed roller 304 functions as a conveyance roller because it rotates with media 50a, 50b sandwiched between the opposed roller 304 and the heat roller 302. In this configuration, the inkjet head 102 in the head 12 ejects color ink onto the sheet-like medium 50a supplied from the medium feeder 306a to form the colored ink layer 202 on the medium 50a. The UV light source 104 then emits ultraviolet rays immediately after landing of ink droplets onto the medium 50a. This heats the ink on the medium 50a instantaneously and evaporates the solvent, thereby drying and fixing the ink. Then, in this case, the colored ink layer 202 is formed on the medium 50a where it passes through the head 12, as illustrated in the figure.

After the colored ink layer 202 is formed on the medium 50a, calendering is performed on the medium 50a and the medium 50b overlapping each other at the heat roller 302 to transfer an image represented by the colored ink layer 202 on the medium 50a to the medium 50b. More specifically, in this process, for example, hot pressing is performed while heating is performed at relatively low temperatures of about 80 to 130° C. This process also fuses or softens the low-temperature thermoplastic resin forming the colored ink layer 202 to allow the color ink forming the colored ink layer 202 to be bonded to the medium 50b.

It is noted that the heating temperature by the heat roller 302 should be chosen to be equal to or lower than the heat resistant temperature of the medium 50a to be used. In this case, the lower heating temperature enables power saving. Therefore, an ink including, for example, a resin exhibiting thermoplasticity at low temperatures as a binder resin is preferably used as color ink for forming the colored ink layer 202.

After the color ink is bonded to the medium 50b in the calendering by the heat roller 302, the separation roller 312 separates the medium 50b from the medium 50a at timing when a portion of the medium 50b moves to the separation roller 312. In this case, for example, the medium 50b is separated at an angle as acute as possible in a state in which the colored ink layer 202 is cooled substantially to room temperature and solidified. Then, because of the difference in adhesion to the color ink, the colored ink layer 202 is transferred from the medium 50a less adhesive to the medium 50b. In this case, since the surface of the transferred colored ink layer 202 has been in contact with the surface of the medium 50a, the colored ink layer 202 is extremely dense and planar. This configuration therefore can also increase the gloss of the colored ink layer 202 appropriately.

As described above, for example, a polypropylene, polyethylene, or silicone rubber film may be used as the medium 50a. Such a medium 50a is usually repellent. Therefore, it is difficult to print such a medium 50a appropriately with a conventional general evaporation-drying ink while preventing bleeding. In this respect, in this modification, a fast-drying ink can be used to appropriately print on such a medium 50a while preventing bleeding. When a fast-drying ink is used, the solvent in the ink evaporates sufficiently at the point of time when ultraviolet rays are emitted. Therefore, even when paper or the like is used as the medium 50b, water or the like hardly moves to the medium 50b in the subsequent transfer. This eliminates the problems such as curling and cockling that tend to occur when a general water-based ink or the like is directly printed on a medium such as paper.

Figure 9:
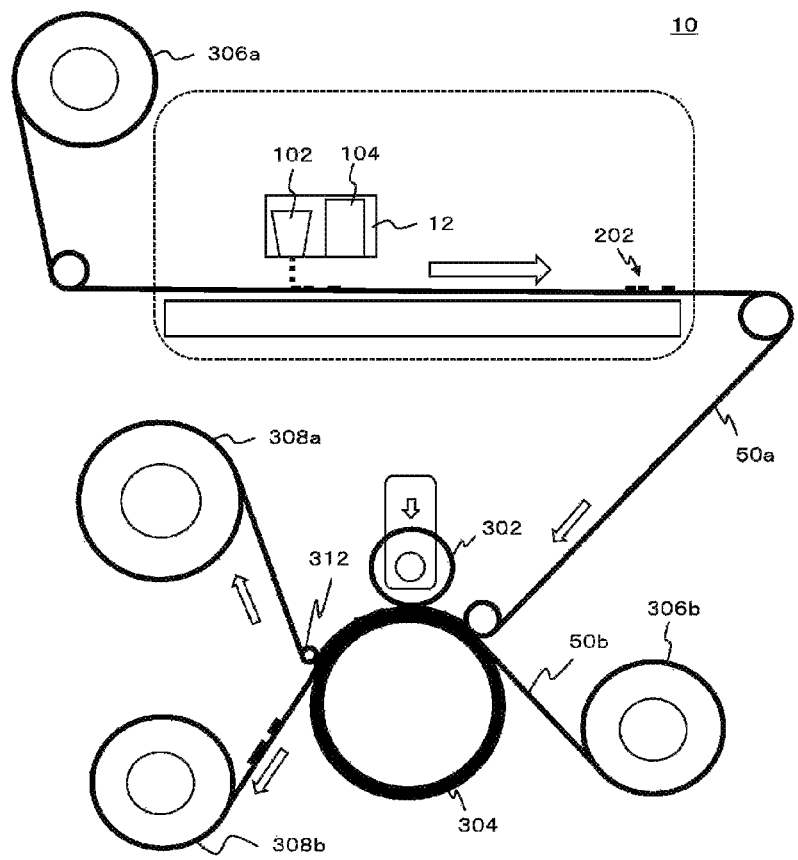
FIG. 9 is a diagram illustrating a further modified configuration of the printing device 10.

The configuration of the printing device 10 for performing the operation of the glossing step by the transfer method using the heat roller 302 is not limited to the configuration described above and may be modified in various ways. FIG. 9 is a diagram illustrating a further modified configuration of the printing device 10 and illustrates another example of the configuration of the printing device 10 for performing the operation of the glossing step by the transfer method using the heat roller 302. In FIG. 9, the configuration denoted by the same reference numerals as in FIGS. 1A to 8 may have the same or similar configuration as the configuration in FIGS. 1A to 8, except for the points described below.

In the configuration illustrated in FIG. 8, the separation roller 312 is disposed at a certain distance from the heat roller 302. However, in the modified configuration of the printing device 10, the separation roller 312 may be disposed closer to the heat roller 302. In this case, the opposed roller 304 pressing media 50a and 50b against the heat roller 302 may be used also as a roller pressing media 50a and 50b against the separation roller 312. This configuration can be considered as, for example, a configuration in which the heat roller 302 and the separation roller 312 are disposed to press media 50a and 50b against the opposed roller 304 serving as a conveyance roller. With this configuration, the printing operation by transfer can also be performed appropriately. For example, this can increase the gloss of the colored ink layer 202 appropriately.

In this case, when heat of the heat roller 302 transfers to the opposed roller 304 to increase the temperature of the opposed roller 304, the temperature of the media 50a and 50b sandwiched between the separation roller 312 and the opposed roller 304 also increases, and the media 50a and 50b may not be appropriately separated by the separation roller 312. For this reason, when the rollers are disposed as illustrated in FIG. 9, for example, it is preferable to additionally use cooling means for preventing temperature increase of the opposed roller 304.

Supplementary remarks, further modifications, and the like will now be described in conjunction with the configurations described above. As described above, the printing device 10 may be either a serial method or a line printer method. In this case, it is preferable that a UV light source be disposed such that ultraviolet rays can be emitted immediately after landing of droplets of color ink onto the medium 50. For example, when printing is performed by the serial method, as illustrated in FIG. 1A, a UV light source is aligned with the inkjet heads 102y to 102k in the sub-scanning direction and disposed at least on the rear side of the inkjet heads for color ink during main scanning operation. In this case, a UV light source is disposed on one side or both sides of the inkjet heads in the main scanning direction, in accordance with the direction in which the inkjet head moves during main scanning operation. In this case, a UV light source may be additionally disposed downstream in the conveyance direction of the medium, in addition to one side or both sides of the inkjet heads. When printing is performed by the line printer method, a UV light source is disposed downstream in the conveyance direction of the medium relative to the inkjet heads for color ink.

As described above, the medium 50 is not limited to any particular medium, and various media can be used. More specifically, various media can be used as the medium 50, ranging from permeable media with no ink receiving layer, such as paper and cloth, to unabsorbable non-coat media. A medium 50 having an ink receiving layer can be used, as a matter of course. As described above, not only a medium for the direct printing method but also a medium for the transfer method can be used. A roll medium described above in conjunction with, for example, FIGS. 7 to 9 can also be used as the medium 50. Cut paper, plastic cards, and the like can be used. When printing is performed by the transfer method, for example, a medium subjected to processing for adjusting the adhesion between the medium 50 and the ink may be used. More specifically, in this case, for example, a medium subjected to surface treatment such as corona treatment for enhancing adhesion may be used.

In the foregoing description, clear ink is applied as an ink for forming the overcoat layer 204 (see FIGS. 2A to 2F) on the colored ink layer 202. However, clear ink may be used, for example, in such a manner as to directly land on a medium 50. In this case, clear ink may be used, for example, in the application of protrusion printing. In some applications of the printing device 10, clear ink may not be used together with color ink but may be used singly.

In the method of increasing the gloss of the colored ink layer 202 by calendering, calendering may be performed in a state in which the overcoat layer 204 is formed on the colored ink layer 202, as described briefly above with reference to FIGS. 5A and 5B and the like. In this case, it is preferable that a fast-drying ink be also used as clear ink. More specifically, when a layer of ink is formed with a fast-drying ink, the layer of ink is, for example, as thin as a few μm per layer (for example, about 1 to 10 μm) in a state in which the solvent in the ink is evaporated. When calendering is performed in a state in which such a thin overcoat layer 204 is formed, the colored ink layer 202 can be glossed more appropriately.

Figure 10:
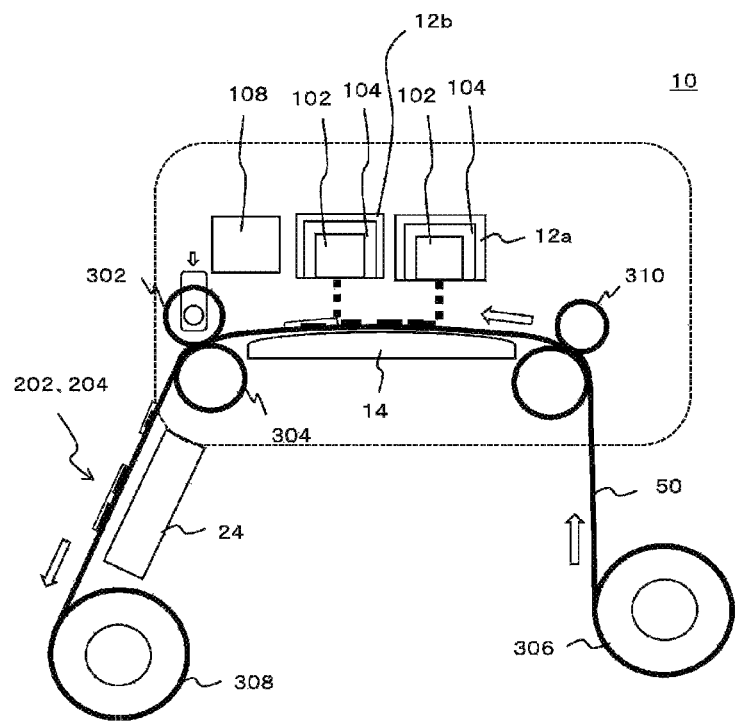
FIG. 10 is a diagram illustrating a further modified configuration of the printing device 10.

In this case, for example, printing may be performed using the printing device 10 having a configuration illustrated in FIG. 10. FIG. 10 is a diagram illustrating a further modified configuration of the printing device 10 and illustrates another example of the configuration of the printing device 10 in a case where the operation of the glossing step is performed by the direct printing method using the heat roller 302. In FIG. 10, the configuration denoted by the same reference numerals as in FIGS. 1A to 9 may have the same or similar features as the configuration in FIGS. 1A to 9, except for the points described below.

In this modification, the printing device 10 further includes a head 12b and a UV light source 108, in addition to the configuration of the printing device 10 illustrated in FIG. 7. A head 12a in the printing device 10 illustrated in FIG. 10 corresponds to the head 12 in the printing device 10 illustrated in FIG. 7. More specifically, in this modification, the head 12a is a head for color ink (for example, each individual color C, M, Y, or K) and has an inkjet head 102 for color ink and a UV light source 104. The head 12b is a head for clear ink and has an inkjet head 102 for clear ink and a UV light source 104.

In this modification, fast-drying ink is used as color ink and clear ink. Thermoplastic ink is used at least as clear ink. In this case, it is preferable that thermoplastic ink be also used as color ink. In this configuration, the UV light source 104 in the head 12b may emit ultraviolet rays weaker than the UV light source 104 in the head 12a. With such a configuration, a more planar overcoat layer 204 can be formed more appropriately.

In this modification, the UV light source 108 emits ultraviolet rays to the ink on the medium 50 between the heads 12a, 12b and the heat roller 302. The use of the UV light source 108 further ensures, for example, that the solvent in the ink evaporates before calendering is performed by the heat roller 302. According to this modification, for example, calendering can be appropriately performed in a state in which the colored ink layer 202 and the overcoat layer 204 are formed on the medium 50. For example, this also increases the gloss of the colored ink layer 202 appropriately.

An underlayer may be formed between the colored ink layer 202 and the medium 50, for example, depending on the desired quality of printing. More specifically, for example, fast-drying ink for primer treatment may be further used to form a primer layer serving as an underlayer for the colored ink layer 202 on the medium 50.

Figure 11:
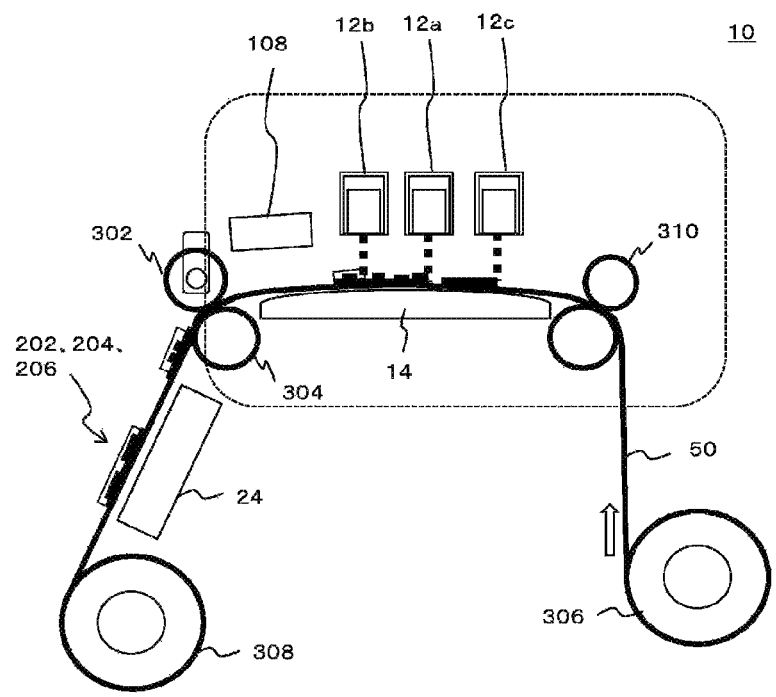
FIG. 11 is a diagram illustrating a further modified configuration of the printing device 10.

FIG. 11 is a diagram illustrating a further modified configuration of the printing device 10 and illustrates yet another example of the configuration of the printing device 10 in a case where the operation of the glossing step is performed by the direct printing method using the heat roller 302. In FIG. 11, the configuration denoted by the same reference numerals as in FIGS. 1A to 10 may have the same or similar configuration as the configuration in FIGS. 1A to 10, except for the points described below.

In this modification, the printing device 10 further includes a head 12c, in addition to the configuration of the printing device 10 illustrated in FIG. 10. The head 12c is a head for primer ink to be used for forming a primer layer 206 and has an inkjet head for primer ink and a UV light source. In this modification, a fast-drying primer ink is used as primer ink. The head 12c is disposed upstream from the heads 12a and 12b in the conveyance direction of the medium 50 as illustrated in the figure. The head 12c thus forms the primer layer 206 under the colored ink layer 202 and the overcoat layer 204 formed by the heads 12a and 12b.

In this configuration, the use of primer ink can enhance the adhesion of the colored ink layer 202 and the like to the medium 50, for example, even when a medium 50 such as flexible packing films is used. In this case, the adhesion of the colored ink layer 202 to the medium 50 refers to, for example, the adhesion of the colored ink layer 202 formed over the medium 50 with the primer layer 206 interposed therebetween. With such a configuration, for example, even in a case where the adhesion of the colored ink layer 202 directly formed on the medium 50 is weak, the colored ink layer 202 can be formed on the medium 50 more appropriately.

In this modification, the overcoat layer 204 is further formed in addition to the primer layer 206 on the colored ink layer 202. In a further modified configuration of the printing device 10, for example, the head 12b may be eliminated and thus the overcoat layer 204 may not be formed. For example, such a configuration can also increase the adhesion of the colored ink layer 202 to the medium 50 appropriately.

The configurations described above can appropriately prevent reduction of gloss due to coarseness of the colored ink layer, for example, when high-speed printing is performed using fast-drying ink. This enables more appropriate use of fast-drying ink, for example, for printing on labels, packages, seals, and the like and in the applications that require glossy prints such as printing on flexible packing films.

In this case, fast-drying ink can be used to print a precise and vivid image appropriately while preventing bleeding even when printing is performed at high speed. In this case, for example, printing can be performed with a thinner layer of ink and at higher density, compared with when known UV-curable ink (UV ink) is used. This enables, for example, printing with quality close to conventional offset printing. For example, a printing device suitable for high-grade digital printing applications can be provided.

Ultraviolet rays are mainly used as energy rays for fast-drying ink in the configurations described above. In this case, for example, substantially transparent known substances can be suitably used as UV absorbers serving as energy absorbers. This can appropriately increase the degree of freedom in selecting a material to be used as energy absorber. In a further modified configuration of the printing device 10, fast-drying ink that generates heat in response to energy rays other than ultraviolet rays may be used. More specifically, in this case, for example, inks that generate heat in response to infrared rays may be used.

INDUSTRIAL APPLICABILITY

The present disclosure can be used suitably for, for example, printing methods.

What is claimed is:

1. A printing method of performing a printing on a medium using a color ink, the color ink being an ink having a color, the printing method comprising:
   a color ink layer forming step of ejecting the color ink to the medium to form a layer of the color ink on the medium; and
   a glossing step of performing a process for increasing a gloss of the layer of the color ink, wherein
   the color ink includes a colorant and a solvent, and the color ink generates heat by radiation of an energy ray,
   in the color ink layer forming step, the energy ray is emitted to the color ink adhering to the medium to remove by evaporation at least a part of the solvent included in the color ink, and
   in the glossing step, the gloss of the layer of the color ink is increased after at least a part of the solvent is removed by evaporation;

wherein in the color ink layer forming step, the energy ray is emitted to the color ink adhering to the medium to heat the color ink to a temperature at which the color ink on the medium boils.

2. The printing method according to claim 1, wherein in the color ink layer forming step, the energy ray is emitted to the color ink adhering to the medium to heat the color ink such that a temperature of the color ink on the medium becomes higher than a temperature of the medium.

3. The printing method according to claim 1, wherein the color ink further comprising one of a resin and a substance to change into resin, and
in the color ink layer forming step, a layer of the color ink including the resin is formed on the medium.

4. The printing method according to claim 1, wherein the color ink comprising a pigment as the colorant.

5. The printing method according to claim 1, wherein in the glossing step, a layer of a light-transmitting ink is formed on the layer of the color ink to increase the gloss of the layer of the color ink, the light-transmitting ink being an ink that allows a light to pass through.

6. The printing method according to claim 5, wherein an ink that generates heat by radiation of the energy ray is used as the light-transmitting ink,
in the color ink layer forming step, the energy ray is emitted to the color ink adhering to the medium in a first condition which is preset, and
in the glossing step, the energy ray is emitted to the light-transmitting ink adhering to the medium in a second condition under which a temperature increase of the ink is milder than in the first condition.

7. The printing method according to claim 5, wherein a thermoplastic ink is used as the light-transmitting ink, and
in the glossing step, the layer of the light-transmitting ink on the medium is planarized by applying a pressure to the layer of the light-transmitting ink, while heating the layer of the light-transmitting ink.

8. The printing method according to claim 1, wherein a thermoplastic ink is used as the color ink, and
in the glossing step, the gloss of the layer of the color ink on the medium is increased by applying a pressure to the layer of the color ink, while heating the layer of the color ink.

9. The printing method according to claim 1, wherein a thermoplastic ink is used as the color ink,
in the color ink layer forming step, a layer of the color ink is formed on a first medium,
the glossing step is a step of transferring the layer of the color ink on the first medium to a second medium different from the first medium, and
the gloss of the layer of the color ink is increased by transferring the layer of color ink to the second medium by applying a pressure for transferring the layer of the color ink from the first medium to the second medium, while heating at least the layer of the color ink in a state in which the first medium and the second medium overlap each other with the layer of the color ink interposed therebetween.

10. The printing method according to claim 1, wherein an ultraviolet ray is used as the energy ray.

11. A printing device configured to perform a printing on a medium using a color ink, the color ink being an ink having color, the printing device comprising:
a color ink layer-forming portion, configured to eject the color ink to the medium to form a layer of the color ink on the medium; and
a glossing portion, configured to perform a process for increasing a gloss of the layer of the color ink, wherein
the color ink includes a colorant and a solvent, and the color ink generates heat by radiation of an energy ray,
the color ink layer-forming portion emits the energy ray to the color ink adhering to the medium to remove by evaporation at least a part of the solvent included in the color ink, and
the glossing portion increases the gloss of the layer of the color ink after at least a part of the solvent is removed by evaporation;
wherein the energy ray is emitted to the color ink adhering to the medium to heat the color ink to a temperature at which the color ink on the medium boils.

12. A printing system configured to perform a printing on a medium using a color ink, the color ink being an ink having color, the printing system comprising:
a color ink layer-forming portion, configured to eject the color ink to the medium to form a layer of the color ink on the medium; and
a glossing portion, configured to perform a process for increasing a gloss of the layer of the color ink, wherein
the color ink includes a colorant and a solvent, and the color ink generates heat by radiation of an energy ray,
the color ink layer-forming portion emits the energy ray to the color ink adhering to the medium to remove by evaporation at least a part of the solvent included in the color ink, and
the glossing portion increases the gloss of the layer of the color ink after at least a part of the solvent is removed by evaporation;
wherein the energy ray is emitted to the color ink adhering to the medium to heat the color ink to a temperature at which the color ink on the medium boils.

* * * * *